(12) United States Patent
Bart et al.

(10) Patent No.: US 10,890,910 B1
(45) Date of Patent: Jan. 12, 2021

(54) DRONE FOR RECOGNIZING AND TESTING MONITORING SYSTEM SENSORS

(71) Applicant: Alarm.com Incorporated, Tysons, VA (US)

(72) Inventors: Gary Franklin Bart, Weston, FL (US); Dean Constantine, Ft. Lauderdale, FL (US)

(73) Assignee: Alarm.com Incorporated, Tysons, VA (US)

( * ) Notice: Subject to any disclaimer, the term of this patent is extended or adjusted under 35 U.S.C. 154(b) by 210 days.

(21) Appl. No.: 16/026,028

(22) Filed: Jul. 2, 2018

Related U.S. Application Data

(60) Provisional application No. 62/527,647, filed on Jun. 30, 2017.

(51) Int. Cl.
| | | |
|---|---|---|
| *G05D 1/00* | (2006.01) | |
| *G05D 1/02* | (2020.01) | |
| *G01K 19/00* | (2006.01) | |
| *G01K 9/00* | (2006.01) | |
| *G08B 29/14* | (2006.01) | |
| *H04N 5/232* | (2006.01) | |
| *G01C 21/20* | (2006.01) | |
| *G06K 9/00* | (2006.01) | |

(52) U.S. Cl.
CPC ......... *G05D 1/0088* (2013.01); *G01C 21/206* (2013.01); *G01K 19/00* (2013.01); *G06K 9/0063* (2013.01); *G08B 29/145* (2013.01); *H04N 5/232* (2013.01); *G05D 1/0202* (2013.01); *G05D 1/0246* (2013.01)

(58) Field of Classification Search
CPC .. G05D 1/0088; G05D 1/0246; G05D 1/0202; G01K 19/00; G06K 9/0063; G08B 29/145; H04N 5/232; G01C 21/206
See application file for complete search history.

(56) References Cited

U.S. PATENT DOCUMENTS

| | | | |
|---|---|---|---|
| 7,860,680 B2 | 12/2010 | Arms | |
| 9,454,907 B2 | 9/2016 | Hafeez | |
| 9,494,936 B2 | 11/2016 | Kerzner | |
| 10,137,984 B1 * | 11/2018 | Flick | B64D 47/00 |
| 10,311,710 B1 | 6/2019 | Bart et al. | |
| 2014/0336928 A1 | 11/2014 | Scott | |

(Continued)

*Primary Examiner* — Nga X Nguyen
(74) *Attorney, Agent, or Firm* — Fish & Richardson P.C.

(57) ABSTRACT

Methods, systems, and apparatus, including computer programs encoded on a storage device, for using a drone to test monitoring system sensors. In one aspect, the drone perform operations that include navigating from a first location of a property towards a second location of the property, detecting a sensor that is installed at the property, interrupting, by the drone, navigation through the property from the first location of the property towards the second location of the property to initiate a test of the detected sensor and (ii) determining a sensor test type for the detected sensor, administering a sensor test to the detected sensor, wherein the sensor test is based on the determined sensor test type, evaluating results of the administered test, storing data describing the results of the administered test, and continuing navigation through the property towards the second location of the property or towards another location of the property.

20 Claims, 5 Drawing Sheets

(56) References Cited

U.S. PATENT DOCUMENTS

| | | |
|---|---|---|
| 2016/0180719 A1 | 6/2016 | Wouhaybi |
| 2016/0232794 A1 | 8/2016 | Hafeez |
| 2018/0089622 A1 | 3/2018 | Burch, V |
| 2018/0130196 A1 | 5/2018 | Loveland |

* cited by examiner

DRONE FOR RECOGNIZING AND TESTING MONITORING SYSTEM SENSORS

CROSS-REFERENCE TO EXISTING APPLICATIONS

This application claims the benefit of U.S. Provisional Patent Application No. 62/527,647 filed Jun. 30, 2017 and entitled "Method For Training A Drone To Recognize And Test Monitoring System Sensors," which is incorporated herein by reference in its entirety.

BACKGROUND

Autonomous surveillance drones ("drones") can navigate a property and use one or more drone-mounted sensors, cameras, or the like to surveil the property. Surveilling the property may include using the drone-mounted sensors, cameras, or the like to capture data about the property, process the captured data, and determine, alone or with the aid of one or more other components of a monitoring system, whether any activity is occurring in the property that may be indicative of a potential event based on the captured data.

However, in a typical monitoring system, a drone is not likely to be continuously performing surveillance operations for the property. When not performing surveillance operations, the drone may be inactive on one or more drone charging stations and sufficiently charged.

SUMMARY

Aspects of the present disclosure are directed towards use of a drone to recognize and test monitoring system sensors. For example, a drone may navigate throughout a property, scan surfaces of the property such as ceilings, walls, and floors in order to detect a sensor that is installed at the property. Such scanning may include the drone capturing of images, and performing an analysis of the images to determine whether the images depict a sensor. If the images depict a sensor, then the drone may further analyze the captured image to determine a particular sensor test type that may be administered to the sensor to test the sensor. Then, the drone may evaluate the results of the sensor test and determine whether the sensor is functioning properly.

In other aspects, the drone performing other types of scanning of the property to detect a sensor. For example, the drone may analyze RF outputs detected within the property and determine whether the RF outputs are indicative of the presence of a sensor installed at the property. The RF sensors may include Bluetooth signals, Wi-Fi signals, cellular signals, or the like. If RF outputs indicative of the presence of a sensor are detected, the drone can identify the location of the sensor based on the detected RF outputs and navigate to the sensor. The type of sensor test administered to the drone be used determined by identifying the drone using stored information obtained from a navigational map of the property or based on images of the captured sensor once the drone arrives at the sensor.

In yet other aspects, a drone may detect a sensor based on marker information stored in a navigational map of the property. For example, the drone may determine to test sensors in the property. Then, the drone may access a stored navigational map of the property to access markers identifying sensor locations of sensors installed at the property. The drone can use the navigational map to navigate to the respective sensors. The drone can also obtain a sensor identifier from the marker, or other stored information in a drone memory (or remote memory accessible via a wireless network such as Wi-Fi, cellular network, or the like), and then use the sensor identifier to obtain a sensor test type for the sensor identified by the sensor identifier, and then use the obtained sensor test type to administer a test to the sensor.

According to one innovative aspect of the present disclosure, a drone is disclosed for recognizing and testing monitoring system sensors. The drone may include one or more processors, one or more storage devices, wherein the storage devices include a plurality of instructions that, when executed by the one or more processors, cause the drone to perform operations. The operations may include navigating, by the drone, from a first location of a property towards a second location of the property, detecting, by the drone, a sensor that is installed at the property, responsive to detecting, by the drone, the sensor that is installed at the property, (i) interrupting, by the drone, navigation through the property from the first location of the property towards the second location of the property to initiate a test of the detected sensor and (ii) determining, by the drone, a sensor test type for the detected sensor, administering, by the drone, a sensor test to the detected sensor, wherein the sensor test is based on the determined sensor test type, evaluating, by the drone, results of the administered test, storing, by the drone, data describing the results of the administered test, and continuing navigation through the property towards the second location of the property or towards another location of the property.

Other aspects include corresponding methods, systems, and computer programs to perform actions of methods defined by instructions encoded on one or more computer storage devices.

These and other versions may optionally include one or more of the following features. For instance, in some implementations, the drone may include a camera coupled to the drone.

In some implementations, detecting, by the drone, a sensor that is installed at the property may include using, by the drone, the camera that is coupled to the drone to capture a plurality of images while the drone is navigating through the property from the first indoor location of the property towards a second indoor location of the property, determining, by the drone, whether a first captured image of the plurality of captured images includes a sensor.

In some implementations, determining, by the drone, whether the first captured image includes a sensor, may include providing, by the drone, the first captured image as an input to a first machine learning model that has been trained to determine whether an image received as an input to the first machine learning model depicts a sensor, and determining, by the drone and based on output data generated by the first machine learning model after processing the input of the first captured image, that the first captured image depicts a sensor.

In some implementations, determining, by the drone, a sensor test type for the detected sensor may include providing, by the drone, the first captured image as an input to a second machine learning model that has been trained to determine a particular sensor test type for an image depicting a sensor that is received as an input to the second machine learning model, and determining, by the drone and based on an output generated by the second machine learning model after processing the input of the first captured image, a particular sensor test type of multiple different sensor test types.

In some implementations, the operations may further include determining, by the drone, whether a second captured image of the plurality of captured images includes a sensor, and responsive to determining, by the drone, that the second captured image does not depict a sensor, continuing navigation through the property towards the second location of the property or towards the other location of the property without providing the second captured image to a second machine learning model that has been trained to determine a particular sensor test type for an image depicting a sensor that is received as an input to the second machine learning model.

In some implementations, determining, by the drone, whether a second captured image of the plurality of captured images includes a sensor may include providing, by the drone, the second captured image as an input to a first machine learning model that has been trained to determine whether an image received as an input to the first machine learning model depicts a sensor, and determining, by the drone and based on output data generated by the first machine learning model based on the first machine learning model processing the input of the first captured image, that the second captured image does not depict a sensor.

In some implementations, responsive to detecting, by the drone, the sensor that is installed at the property, (i) interrupting, by the drone, navigation through the property from the first location of the property towards the second location of the property to initiate a test of the detected sensor and (ii) determining, by the drone, a sensor test type for the detected sensor may include responsive to determining, by the drone, that the first captured image depicts a sensor, (i) interrupting, by the drone, navigation through the property from the first indoor location of the property towards the second indoor location of the property to initiate a test of the sensor depicted in the first captured image and (ii) determining, by the drone, a sensor test type for the sensor depicted by the first captured image.

In some implementations, the operations may include transmitting, by the drone prior to administering the sensor test, a message to a monitoring system that instructs the monitoring system to disregard sensor data generated by the sensor for a predetermined amount of time.

In some implementations, the drone may include a sensor testing unit, and the sensor may be a smoke detector. In such implementations, administering, by the drone, a sensor test to the sensor may include using, by the drone, the sensor testing unit to emit an airborne material that is configured to trigger the smoke detector to generate sensor data that is indicative of the presence of smoke.

In some implementations, the drone may include a communication unit. In such implementations, evaluating, by the drone, the results of the administered test may include using, by the drone, the communication unit to detect whether the smoke detector generated sensor data that is indicative of the presence of an airborne material that is configured to trigger the smoke detector to generate sensor data that is indicative of the presence of smoke, and responsive to detecting, by the drone, that the smoke detector generated sensor data that is indicative of the presence of smoke, determining, by the drone, that the smoke detector is functioning properly, or responsive to determining, by the drone, that the smoke detector did not generate sensor data that is indicative of the presence of smoke within a predetermined amount of time of administering the sensor test, determining, by the drone, that the smoke detector is not functioning properly.

In some implementations, the drone may include a sensor testing unit, and the detected sensor may be a carbon monoxide detector. In such implementations, administering, by the drone, a sensor test to the detected sensor may include using, by the drone, the sensor testing unit to emit carbon monoxide gas that is configured to trigger the carbon monoxide sensor to generate sensor data that is indicative of the presence of carbon monoxide.

In some implementations, the drone may include a communication unit. In such implementations, evaluating, by the drone, the results of the administered test may include using, by the drone, the communication unit to detect whether the carbon monoxide sensor generated sensor data that is indicative of the presence of carbon monoxide, and responsive to detecting, by the drone, that the smoke detector generated sensor data that is indicative of the presence of carbon monoxide, determining, by the drone, that the carbon monoxide detector is functioning properly, or responsive to determining, by the drone, that the carbon monoxide detector did not generate sensor data that is indicative of the presence of carbon monoxide within a predetermined amount of time of administering the sensor test, determining, by the drone, that the carbon monoxide detector is not functioning properly.

In some implementations, the drone may include a sensor testing unit, and the detected sensor may include a glass break sensor. In such implementations, administering, by the drone, the sensor test to the detected sensor may include using, by the drone, a sensor testing unit to output an audio signal configured to trigger the glass break sensor to generate sensor data that is indicative of an occurrence of breaking glass.

In some implementations, the drone may include a communication unit. In such implementations, evaluating, by the drone, the results of the administered test may include using, by the drone, the communication unit to detect whether the glass break sensor generated sensor data that is indicative of an occurrence of breaking glass, and responsive to detecting, by the drone, that the glass break sensor generated sensor data that is indicative of an occurrence of breaking glass, determining, by the drone, that the glass break sensor is functioning properly, or responsive to determining, by the drone, that the glass break sensor did not generate sensor data that is indicative of an occurrence of breaking glass within a predetermined amount of time of administering the sensor test, determining, by the drone, that the glass break sensor is not functioning properly.

In some implementations, the drone may include a sensor testing unit, and the detected sensor may include a thermometer. In such implementations, administering, by the drone, a sensor test to the detected sensor may include using, by the drone, the sensor testing unit to generate air flow towards the thermometer to trigger the thermometer to generate sensor data that is indicative of a change in temperature from a point in time prior to the generation of the air flow by the sensor testing unit, wherein the temperature of the air flow is different than the temperature of the room where the drone and thermometer are located.

In some implementations, the drone may include a communication unit. In such implementations, evaluating, by the drone, the results of the administered test may include using, by the drone, the communication unit to detect whether the thermometer generated sensor data that is indicative of a change in temperature responsive to the generated air flow, and responsive to detecting, by the drone, that the thermometer generated sensor data that is indicative of a change in temperature responsive to the generated air flow, determining, by the drone, that the thermometer is functioning properly, or responsive to determining, by the drone, that the thermometer did not generate sensor data that is indicative of a change in temperature responsive to the generated air flow within a predetermined amount of time of administering the sensor test, determining, by the drone, that the thermometer is not functioning properly.

In some implementations, the drone may include sensor test unit, and the detected sensor is a motion sensor. In such implementations, administering, by the drone, a sensor test to the detected sensor may include navigating, by the drone, through a portion of a property being monitored by a motion sensor to trigger the motion sensor to generate sensor data that is indicative of the presence of a moving object.

In some implementations, the drone may include a communication unit. In such implementations, evaluating, by the drone, results of the administered test may include using, by the drone, a communication unit to detect whether the motion sensor generated sensor data that is indicative of the presence of a moving object, and responsive to detecting, by the drone, that the motion sensor generated sensor data that is indicative of the presence of a moving object, determining, by the drone, that the motion sensor is functioning properly, or responsive to determining, by the drone, that the motion sensor did not generate sensor data that is indicative of the presence of a moving object within a predetermined time of administering the sensor test, determining, by the drone, that the motion sensor is not functioning properly.

These, and other aspects of the present disclosure provide multiple advantages. For example, the present disclosure allows a drone to test and monitor monitoring system sensors installed at a property to ensure that the sensors are functioning properly. This is an important improvement on existing system because the drone can ensure, using the techniques of the present disclosure, that the monitoring system sensors installed at the property are functioning for their intended purpose. This improves the performance of the monitoring system that relies upon these sensors by ensuring that the monitoring system sensors will accurately detect events such as break-ins, fires, carbon monoxide leaks, and other events. As such, the present disclosure provides advantages that result in a technical innovation that can improve the performance of a monitoring system, potentially save lives, and protect a person's property. Moreover, the techniques of the present disclosure further improve upon the existing techniques by enable a drone to navigate a property and test monitoring system sensors without supervision from the monitoring system.

DETAILED DESCRIPTION

Figure 1:
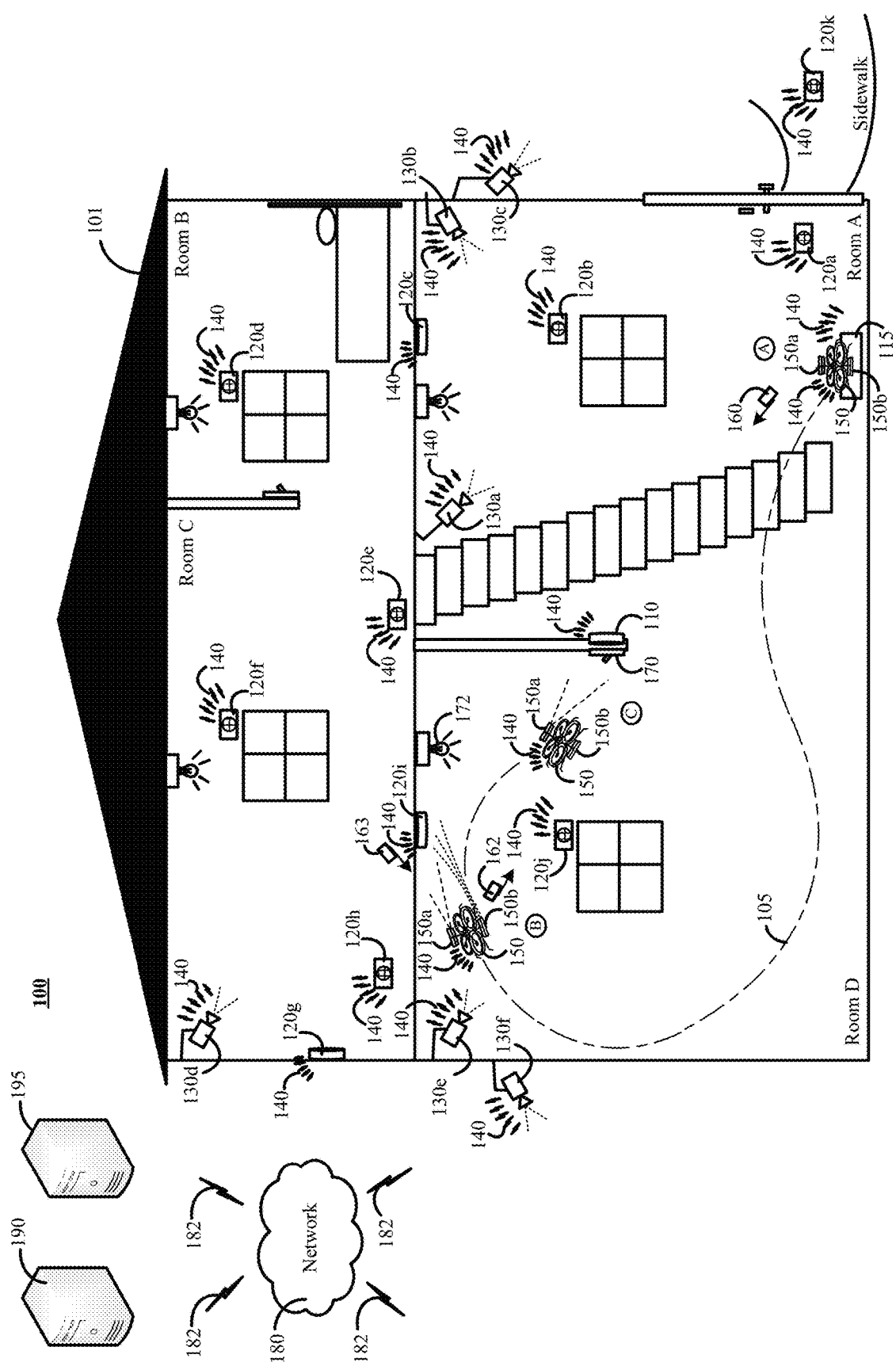
FIG. 1 is a contextual diagram of an example of a system that tests monitoring system sensors using a drone that has been trained to recognize and test monitoring system sensors.

FIG. 1 is a contextual diagram of an example of a monitoring system 100 that tests monitoring system sensors 120a, 120b, 120c, 120d, 120e, 120f, 120g, 120h, 120i, 120j, 120k using a drone 150 that has been trained to recognize and test monitoring system sensors 120a, 120b, 120c, 120d, 120e, 120f, 120g, 120h, 120i, 120j, 120k.

The monitoring system 100 may include at least a monitoring system control unit 110, a drone charging station 115, a network connection 140, a drone 150, and one or more sensors 120a, 120b, 120c, 120d, 120e, 120f, 120g, 120h, 120i, 120j, 120k. In some implementations, the monitoring system 100 may also include one or more cameras 130a, 130b, 130c, 130d, 130e, 130f, a network connection 180, one or more communication links 182, a monitoring application server 190, and a central alarm station server 195.

The monitoring system control unit 110 is configured to detect and process (i) sensor data generated by the one or more sensors 120a, 120b, 120c, 120d, 120e, 120f, 120g, 120h, 120i, 120j, 120k, (ii) images, videos, or the like captured and transmitted by the one or more cameras 130a, 130b, 130c, 130d, 130e, 130f, (iii) images, videos, or the like captured and transmitted by a drone 150 mounted camera, (iv) sensor data generated by one or more drone 150 mounted sensors, (v) messages generated and broadcasted by the drone 150, or (vi) a combination thereof. In some implementations, the monitoring system control unit 110 may be configured to perform processing and analysis of the detected data to determine whether one or more potential events such as an alarm event is occurring at the property 101.

In some implementations, the monitoring application server 190 may supplement, or replace, the functionality of the monitoring system control unit 110. For example, the monitoring system control unit 110 may detect and relay (i) sensor data generated by the one or more sensors 120a, 120b, 120c, 120d, 120e, 120f, 120g, 120h, 120i, 120j, 120k, (ii) images, videos, or the like captured and transmitted by the one or more cameras 130a, 130b, 130c, 130d, 130e, 130f, (iii) images, videos, or the like captured and transmitted by a drone 150 mounted camera 150a, (iv) sensor data generated by one or more drone 150 mounted sensors, (v) messages generated and broadcasted by the drone 150, or (vi) a combination thereof, to a monitoring application server 190 using the network connections 140, 180, and one or more communications links 182. In such implementations, the monitoring application server 190 may perform processes and analysis of the relayed data in an effort to detect the potential existence of one or more events such as alarm events.

In some implementations, the monitoring application server 190 may be a cloud-based solution that can replace the local monitoring system control unit 110. For example, in this implementation (and other implementations) each sensor, camera, drone, or the like may be equipped with a cellular communication device that can directly communicate generated sensor data, captured camera data, drone sensor data, drone camera data, drone generated messages, or the like to the monitoring application server 190 via the one or more network connections 140, 180, and one or more communication links 182. The monitoring application server 190 can then perform processing and analysis of the sensor data, camera data, and drone data that it receives in order to detect the potential existence of one or more events such as alarm events. Accordingly, in some implementations, the monitoring application server 190 may be configured to perform each of the operations described herein as being performed by the monitoring system control unit 110.

The drone 150 may include a camera 150a and a sensor testing unit 150b. The camera 150a may be configured to capture still images, video images, or the like. The sensor testing unit 150b may include one or more testing devices that can be used to test one or more sensors 120a, 120b, 120c, 120d, 120e, 120f, 120g, 120h, 120i, 120j, 120k installed at the property 101. For example, the sensor testing unit 150b may have a smoke generation unit that can be used to test a smoke detector. In addition, the sensor testing unit 150b may be configured to detect and analyze sensor data that is generated by a sensor in response to an administered sensor test. For example, in response to generating smoke in the vicinity of a smoke detector, the drone 150 may use the sensor testing unit 150b to determine whether the smoke detector generated and broadcast sensor data that is indicative of the presence of smoke.

The drone 150 may also be configured to include a communication unit (shown in FIG. 5) that allows the drone 150 to wirelessly communicate with one or more other components of the monitoring system 100. For example, the drone 150 may use the communication unit to detect, receive, or otherwise obtain sensor data that is broadcast by one or more sensors 120a, 120b, 120c, 120d, 120e, 120f, 120g, 120h, 120i, 120j, 120k. In addition, the drone 150 may use the communication unit to transmit messages to, or receive messages from, the monitoring system control unit 110, the monitoring application server 190, or both.

The drone 150 can be trained to autonomously perform monitoring operations to monitor the functionality of components of the monitoring system 100 such as sensors 120a, 120b, 120c, 120d, 120e, 120f, 120g, 120h, 120i, 120j, 120k, cameras 130a, 130b, 130c, 130d, 130e, 130f, and the like. The monitoring operations may include, for example, the drone 150 autonomously navigating the property 101 to identify one or more sensors 120a, 120b, 120c, 120d, 120e, 120f, 120g, 120h, 120i, 120j, 120k, and administer a test of the one or more identified sensors 120a, 120b, 120c, 120d, 120e, 120f, 120g, 120h, 120i, 120j, 120k. To perform such monitoring operations, the drone 150 may be trained to (i) identify a sensor, and (ii) determine a test type that is associated with the sensor. A test type is associated with a sensor if the test type is the type of test that is used to test the sensor.

The performance of such monitoring operations may be performed by the drone 150 in response to the expiration of one or more predetermined time periods. For example, the drone 150 may initiate performance of monitoring operations in response to the determination that the drone's 150 battery is charged and the drone has been idle on a charging station for more than a predetermined amount of time. Alternatively, or in addition, the drone 150 may initiate performance of such monitoring operations in response to a determination that one or more sensors 120a, 120b, 120c, 120d, 120e, 120f, 120g, 120h, 120i, 120j, 120k have not been tested for more than a predetermined amount of time. Alternatively, or in addition, the drone 150 may initiate performance of such monitoring operations in response to an instruction from the monitoring system control unit 110, the monitoring application server 190, a user device (shown in FIG. 5), or the like. For example, the monitoring system control unit 110 may instruct the drone 150 to perform monitoring operations in response to the expiration of one or more of the aforementioned periods of time. Alternatively, the monitoring system control unit 110 may instruct the drone 150 to perform monitoring operations in response to a determination that one or more sensors 120a, 120b, 120c, 120d, 120e, 120f, 120g, 120h, 120i, 120j, 120k may not be operating properly. Alternatively, or in addition, the drone 150 may initiate performance of such monitoring operations based on the determined occurrence of a scheduled sensor testing event. For example, the drone 150 may store one or more predetermined dates, times, or both, indicating that the drone 150 should initiate sensor monitoring operations at the predetermined dates, times, or both, With reference to the example of FIG. 1, the drone 150 may be coupled to a dock such as a charging station 115 at stage A. The drone 150 may initiate monitoring operations that includes autonomously navigating the property 101 and testing one or more sensors 120a, 120b, 120c, 120d, 120e, 120f, 120g, 120h, 120i, 120j, 120k. The drone 150 may determine to initiate monitoring operations independent of an instruction to perform monitoring operations from the monitoring system control unit 110, the monitoring application server 190, or both. Alternatively, the drone 150 may determine to initiate monitoring operations in response to an instruction to initiate monitoring operations from the monitoring system control unit 110, the monitoring application server 190, or a user device (shown in FIG. 5). In some implementations, the drone 150 may only initiate monitoring operations after the monitoring system has been armed to ensure that a respective sensor will adequately respond to an administered test, if functioning properly.

Performance of monitoring operations may begin with the drone 150 launching from the dock (e.g., charging station 115). The drone 150 may navigate the navigation path 105 through the property 101 to locate and test one or more sensors 120a, 120b, 120c, 120d, 120e, 120f, 120g, 120h, 120i, 120j, 120k. In some implementations, the drone 150 may transmit a message 160 to the monitoring system control unit 110, the monitoring application server 190, or the like once performance of monitoring operations begin. The message 160 may inform the monitoring system control unit 110, monitoring application server 190, or both, that the drone 150 is initiating monitoring operations and instruct the monitoring system control unit 110, monitoring application server 190, or both, to disregard (e.g., ignore) sensor data generated by one or more sensors 120a, 120b, 120c, 120d, 120e, 120f, 120g, 120h, 120i, 120j, 120k to avoid triggering a false alarm. In some implementations, drone 150 may instruct the monitoring system control unit 110, monitoring application server 190, or both, to perform other operations instead of disregarding (e.g., ignoring) sensor data generated during the monitoring operations. For example, the drone 150 may instruct the monitoring system control unit 110, monitoring application server 190, or both, to communicate with the drone 150 in response to detecting sensor data from one or more sensors 120a, 120b, 120c, 120d, 120e, 120f, 120g, 120h, 120i, 120j, 120k. The communication may include the monitoring system control unit 110, the monitoring application server 190, or both, to ask the drone 150 whether the drone 150 tested a particular sensor in response to the monitoring system control unit 110, the monitoring application server 190, or both, detecting sensor data indicative of a particular event being generated by the particular sensor.

The drone 150 may navigate a navigation path 105 through the property 101 and use the camera 150a to scan for one or more sensors 120a, 120b, 120c, 120d, 120e, 120f, 120g, 120h, 120i, 120j, 120k. Scanning for one or more sensors may include, for example, the drone 150 using the camera 150a to (i) capture an image of a portion of the property 101 and (ii) provide the image of the portion of the property to a first machine learning model that has been trained to determine whether or not an image includes a sensor. If the drone 150 determines that the image includes a sensor, the drone 150 may interrupt the drone's 150 navigation path so that the drone 150 remains near the detected sensor. Alternatively, if the drone 150 determines that the drone 150 is not yet within a predetermined distance of the sensor depicted in the captured image, the drone 150 can continue navigating towards the sensor depicted in the captured image until the drone 150 is within a predetermined distance of the sensor depicted in the captured image. The drone 150 may determine a distance between the drone 150 and the sensor depicted in the captured image using one or more drone-mounted sensors such as an infrared sensor, a laser sensor, or the like. Alternatively, the drone 150 may analyze the captured image of the sensor and determine a distance to the sensor based on image analysis based on the size of the sensor, based on a comparison of the difference in size of the sensor in multiple different pictures of the sensor captured by the drone, or the like. The drone 150 can provide the captured image to a second machine learning model that has been trained to determine a sensor test type for the sensor. The drone 150 may select a particular sensor test type based on the output of the second machine learning model.

By way of example, at stage B the drone 150 may use the camera 150a to capture an image during scanning that includes a sensor such as smoke detector 120i. The drone 150 may provide the captured image to a first machine learning model that has been trained to classify an input image as either (i) likely depicting a sensor or (ii) not likely depicting a sensor. For example, the first machine learning model may include a neural network that has been trained to calculate an output value indicating a likelihood that the image should be classified into each respective class. The value may include a probability. If the drone 150 determines, based on the output of the first machine learning model, that the image likely includes a sensor, then the drone 150 may provide the captured image to a second machine learning model. In some implementations, the drone 150 may determine that the image belongs to the class for which the highest output value was calculated. For example, with reference to FIG. 1, the drone may determine, based on the output of the first machine learning model, that the captured image is an image that likely depicts a sensor based on processing of the image of the smoke detector 120i. If the drone 150 determines, based on the output of the first machine learning model, that the image likely does not depict a sensor, then the drone 150 does not provide the captured image to a second machine learning model.

The second machine learning model has been trained to determine a sensor test type. The second machine learning model may include a neural network that has been trained to classify the captured image that depicts a sensor as likely being associated with a particular test type of a plurality of sensor test types. The second machine learning model may be trained to classify the image that likely depicts a sensor into a particular class of sensor test types. For example, the second machine learning model may include a neural network that has been trained to calculate an output value indicating a likelihood that an input image that likely depicts a sensor is likely associated with each respective sensor test type of a plurality of sensor test types. The value may include a probability. The drone 150 may select a particular sensor test type that will be used to test a sensor based on the output of the second machine learning model. In some implementations, the drone 150 may select the sensor test type that is for which the highest output value was calculated.

In the example of FIG. 1, the drone 150 may determine, based on the output of the second neural network, that the sensor in the image is associated with a "smoke" test type. Based on the second machine learning model's classification of the captured image, the drone 150 may administer a test of the smoke detector 120i by using the sensor testing unit 150b to emit a chemical based smoke, fog, or the like that is designed to trigger the smoke sensor 120i to generate sensor data that is indicative of the potential presence of smoke.

In some implementations, the drone 150 may generate and transmit a message to the monitoring system control unit 110, the monitoring application server, or both, indicating that the drone is going to test the smoke detector 120i. The message may instruct the monitoring system control unit 110, the monitoring application server 190, or both, to disregard (e.g., ignore) any sensor data generated by the smoke detector 120i. Disregarding the generated sensor data may include, for example, not triggering an alarm indicative of a potential event in response to detection of generated sensor data.

The drone 150 may use the drone's communication unit to detect whether smoke sensor 120i generated sensor data that is indicative of the potential presence of smoke in response to the administered test. For example, a fully functioning smoke detector 120i may generate and broadcast sensor data 163 that can be detected by the drone 150. The sensor data 163 may include data indicating that the smoke detector 120i has detected the potential existence of smoke in Room D. Alternatively, for example, a smoke detector 120i may not generate and broadcast sensor data 163 that can be detected by the drone's communication unit if the smoke detector 120i is not functioning properly. In such instances, if the drone's communication unit does not detect sensor data indicative of the existence of smoke in Room D within a predetermined period of time after administering the test, the drone 150 may determine that the smoke detector 120i is defective.

In some implementations, the predetermined period of time may be based on the type of sensor test administered. For example, a drone 150 may wait to detect sensor data longer than a drone 150 may wait to detect glass breaking because smoke takes longer to dissipate than glass takes to break. Alternatively, or in addition, the predetermined period of time may be based on sensor delay in generating sensor data after detection of an event. For example, a smoke sensor may have a 500 millisecond delay after detecting an event. In such instances, the drone 150 may need to wait at least 500 milliseconds to detect sensor data before determining that the sensor is not functioning properly.

The drone 150 may continue along the navigation path 105 after testing the smoke detector 120i. Continuing along the navigation path 105 may include, for example, the drone 150 autonomously navigating the property 105 and scanning the property using the camera 150a to scan for one or more sensors 120a, 120b, 120c, 120d, 120e, 120f, 120g, 120h, 120i, 120j, 120k.

With further reference to the example of FIG. 1, at stage B the drone 150 may use the camera 150a to capture an image during scanning that includes a light switch 170. The drone 150 may provide the captured image to a first machine learning model that has been trained to determine whether or not the image includes a sensor. In this instance, the first machine learning model may classify the captured image as not including a sensor. In such circumstances, the drone 150 does not provide the image to the second machine learning model that has been trained to determine a sensor test type based on an input of an image depicting a sensor. Instead, the drone 150 continues to scan the property 101 for one or more sensors 120*a*, 120*b*, 120*c*, 120*d*, 120*e*, 120*f*, 120*g*, 120*h*, 120*i*, 120*j*, 120*k* by capturing one or more images using the drone's camera 150*a* and providing the one or more captured images to the first machine learning model that has been trained to determine whether an image includes a picture of a sensor.

A drone 150 is described above that can navigate a property 101, scan surfaces of the property 101 to detect sensors such as sensors 120*a*, 120*b*, 120*c*, 120*d*, 120*e*, 120*f*, 120*g*, 120*h*, 120*i*, 120*j*, 120*k*, and then administer a test of the detected sensors. In one aspect, the drone 150 is described as performing the sensor testing process by capturing one or more images, determining, based on the captured images, whether the captured images depict a sensor, and then if the captured images depict a sensor, determining what type of test should be administered to the sensor to test the sensor. However, the present disclosure need not be so limited.

For example, instead of, or in addition to, using images captured by a camera, the drone 150 may use other forms of sensor detection. In some implementations, for example, the drone 150 may use one or more radio frequency (RF) receives to detect radio waves output by a sensor and then determine the location of the sensor based on the detected RF waves. In other implementations, the drone 150 may use Bluetooth to detect the presence of a sensor. Yet even other techniques may be used such radar, sonar, LIDAR, or the like, may be used to detect the presence of a sensor installed at the property 101. In yet other implementations, the drone 150 may detect the presence of a sensor installed at the property based on a navigational map of the property 101 that is stored in the drone's 150 memory. For example, the navigational map stored in the drone's 150 memory may include a marker for each respective sensor that is installed at the property 101. In addition to a location within the property, the marker may also include a sensor identifier that he drone 150 can use to obtain stored information about the sensor such as a particular sensor test type that can be used to test the sensor. Accordingly, one or more of these implementations that that use a drone 150 to detect a sensor and determine a sensor test type for the sensor also fall within the scope of this disclosure. Such implementations need not use images obtained by the drone 150 to detect a sensor.

However, other implementations can also use a combination of these techniques to detect a sensor and determine a sensor test type for the sensor. For example, a drone 150 may capture an image and use the image to detect a potential location of a sensor. Then, the drone 150 may use a navigational map stored in the memory of the drone 150 to confirm that the image depicts a sensor, to navigate closer to the sensor, or the like. By way of another example, the drone 150 may use a captured image depicting a sensor to detect a sensor and then obtain predefined information for that particular sensor type without providing the captured image to a second machine learning model.

Figure 2:
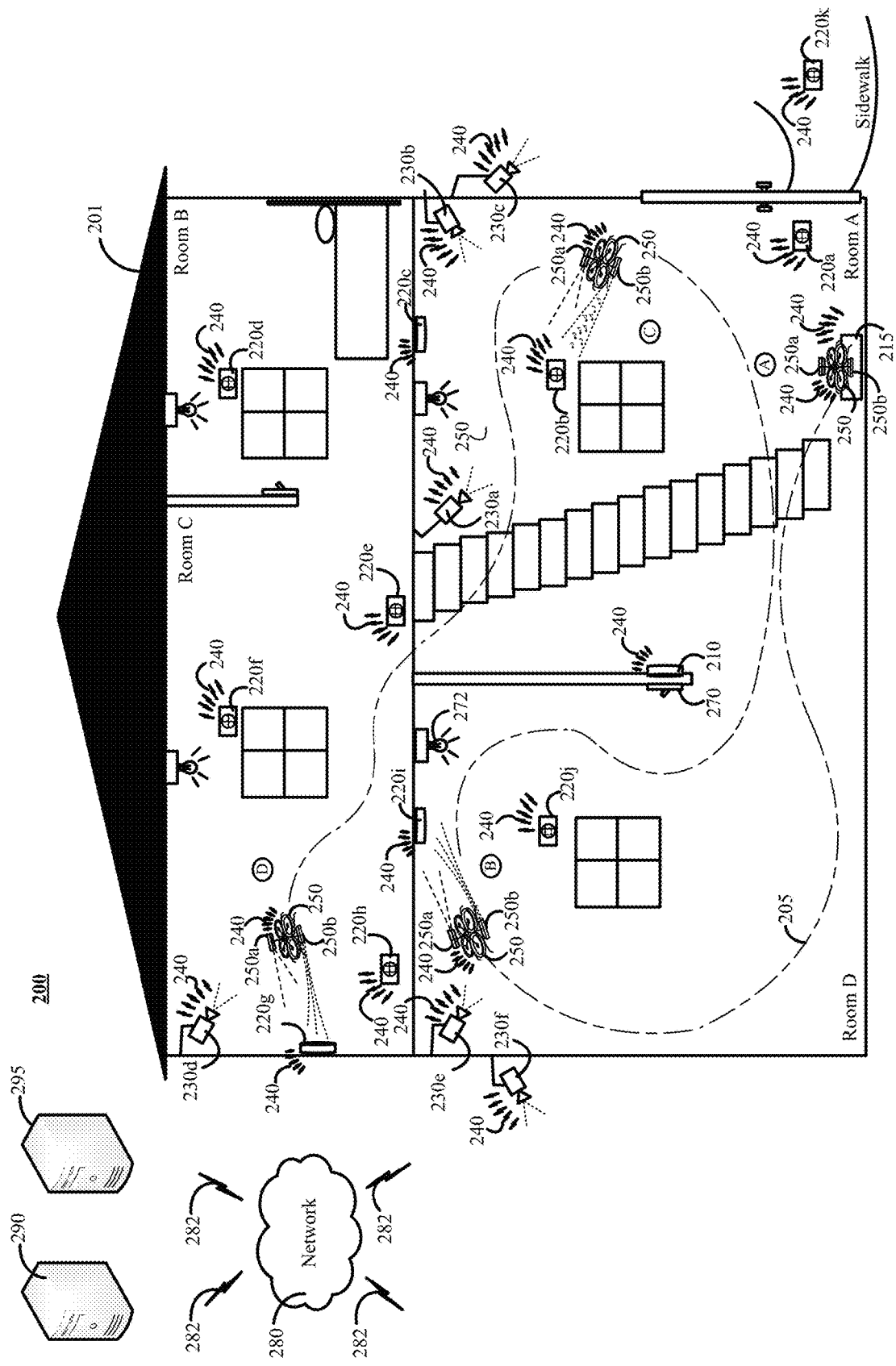
FIG. 2 is another contextual diagram of an example of a system that tests monitoring system sensors using a drone that has been trained to recognize and test monitoring system sensors.

FIG. 2 is another contextual diagram of an example of a monitoring system 200 that tests monitoring system sensors 220*a*, 220*b*, 220*c*, 220*d*, 220*e*, 220*f*, 220*g*, 220*h*, 220*i*, 220*j*, 220*k* using a drone 250 that has been trained to recognize and test monitoring system sensors 220*a*, 220*b*, 220*c*, 220*d*, 220*e*, 220*f*, 220*g*, 220*h*, 220*i*, 220*j*, 220*k*.

The system 200 of FIG. 2 is substantially similar to the system of FIG. 1. However, instead of navigating to, and testing, a single sensor, the drone 250 may autonomously navigate the property 201 testing multiple different sensors 220*i*, 220*b*, 220*g* as the drone 250 detects the presence of each respective sensor 220*i*, 220*b*, 220*g*. In some implementations, the drone 250 may launch from the charging station 215 in order to perform a task that includes testing multiple different sensors 220*i*, 220*b*, 220*g*. Alternatively, the drone 250 may launch from the charging station 215 in order to perform other operations such as routine surveillance operations. However, in such instances, the drone 250 can be configured to each of the respective sensors 220*i*, 220*b*, 220*g* that the drone 250 encounters during the operations (e.g., routine surveillance operations).

By way of example, with reference to FIG. 2, the drone 250 may launch from the charging station 215 and begin navigating through the property along a navigation path 205. The navigation path 205 may be a predetermined navigation path that the drone 250 can travel in order to navigate within predetermined proximity of one or more sensors 220*a*, 220*b*, 220*c*, 220*d*, 220*e*, 220*f*, 220*g*, 220*h*, 220*i*, 220*j*, 220*k*. Alternatively, the navigation path 205 may be dynamically determined with reference to a map such as a three-dimensional volumetric map, one or more drone 250 sensors, or a combination thereof during routine surveillance operations.

During navigation along the navigation path 205, the drone 250 may use the drone's camera 250*a* to capture images of the property 201. Each captured image may be provided to a first machine learning model that is trained to classify an input image as either (i) depicting a sensor or (ii) not depicting a sensor. The drone 250 may determine, based on the output of the first machine learning model, whether the image depicts a monitoring control system sensor. If the drone 250 determines that the captured image does not include a monitoring system sensor, then the drone 250 may continue navigating through the property 201. The drone 250 may continue to navigate along navigation path 205, capture one or more images, and to provide each respective captured image to the first machine learning model. For example, the drone 250 may capture multiple images from just after the drone's 250 launch from the charging station 215 to the just prior to the drone's 250 location at stage B and none of the captured images may be determined to likely include an image of a sensor.

However, at stage B, the drone 250 can capture an image of the sensor such as smoke detector 220*i* using the camera 250. The drone can provide the captured image of the smoke detector 220*i* to a first machine learning model that is trained to determine the likelihood that the captured image depicts a sensor. In this instance, the drone 250 may determine, based on the output of the first machine learning model, that the captured image of the smoke detector 220*i* likely depicts a sensor. The drone 250 may provide the captured image to a second machine learning model. The second machine learning model is trained to predict the likelihood that the image likely depicts a sensor that is likely associated with a particular sensor test type. With reference to the example of FIG. 2 at stage B, the drone 250 may determine, based on the output of the second machine learning model, that the sensor that is likely depicted by the captured image is likely associated with a "smoke" test. In response to the drone 250 determining that the sensor that is likely depicted by the captured image is likely associated with a "smoke" test, the drone 250 may use the sensor testing unit 250*b* to administer a "smoke" test.

The sensor testing unit 250b may administer a "smoke" test by, for example, emitting a chemical based smoke, fog, or the like that is designed to trigger a smoke sensor such as smoke detector 220i. In some implementations, the sensor testing unit 250b, or other portion of the drone 250, may be equipped with a fan that can be used to direct the smoke towards the sensor. The drone 250 may communicate with the monitoring system control unit 110, the monitoring application server 190, or both, before the administered test, during the administered test, after the administered test, or a combination thereof, to inform the monitoring system control unit 110, the monitoring application server 190, or both, that the smoke detector 220i is being tested as described with reference to the smoke detector 120i in FIG. 1. As a result of such communications, the monitoring system control unit 110, the monitoring application server 190, or both, may disregard (e.g., ignore) any sensor data generated by the smoke detector 220i as a result of the smoke detector test at stage B and avoid triggering a false alarm.

The drone 250 may evaluate the response to the administered test of the smoke detector 220i. For example, the drone 250 can determine whether the smoke detector 220i generated sensor data that is indicative of the presence of smoke in response to the administered test. In response to detecting sensor data generated by the smoke detector in response to the test, the drone 250 can evaluate whether the generated sensor data is indicative of the potential presence of smoke. If the generated sensor data is indicative of the potential presence of smoke, then the drone 250 can store data indicating that the smoke detector 220i is functioning properly. Alternatively, if the smoke detector 220i generates sensor data that is not indicative of the potential presence of smoke (e.g., noisy data, corrupt data, or the like) or the smoke detector 220i does not generate sensor data in response to the "smoke" test, then the drone 250 can store data indicating that the smoke detector 220i is not functioning properly. In some implementations, the drone 250 may transmit a sensor status report to the monitoring system control unit 110, the monitoring application server 190, or a user device the provides data indicating the status of the smoke detector 220i alone, or in combination, with the sensor status of other sensors in the property 201.

With respect to the aforementioned example describe drone 250 functionality at stage B, it is noted that the drone 250 need not necessarily make a determination that the sensor 220i that is likely depicted by the captured image is a smoke detector. Instead, the drone 250 can determine, based on respective output values provided by the first machine learning model and the second machine learning model, respectively, that a sensor likely exists within the drone's 250 "line of sight" and that the sensor is likely associated with a particular sensor test type. The drone 250 can then administer the particular sensor test in the approximate vicinity of sensor. The drone's line of sight may include a portion of the property 201 that can be captured by the drone's camera 250a.

In some implementations, the drone 250 may need to navigate closer to administer the selected test to the sensor 220i after determining that a captured image likely includes a sensor that is likely associated with the selected test. The drone 250 may approximate the distance between the drone 250 and the sensor 220i based on the size of the sensor 220i in the captured image with respect its surroundings. For example, a sensor that is larger in scale compared to its surroundings may be closer than a sensor that is smaller in scale to its surrounds. In such implementations, the drone 250 may capture multiple images of a likely sensor, and compare scale and size of the likely sensor two or more of the multiple images to approximate the drone's 250 distance to the likely sensor. Alternatively, the location of the sensor may be approximated by the drone 250 using a variety of methods such as using one or more IR sensors to determine the distance between the drone 250 and the sensor 220i.

Continuing the example of FIG. 2, the drone 250 may continue navigating along the path 205 through the property 201 using the camera 250a to scan for the surfaces of the property 201 for one or more sensors. At stage C, the drone 250 may capture an image that includes that includes a sensor such as glass-break sensor 220b. The drone 250 may provide the captured image of the glass-break sensor 220b to a first machine learning model that has been trained to determine the likelihood that the captured image depicts a sensor. In this instance, the drone 250 may determine, based on the output of the first machine learning model, that the captured image of the glass-break sensor 220b likely depicts a sensor. The drone 250 may provide the captured image to a second machine learning model. The second machine learning model is trained to predict the likelihood that the image a particular sensor test type should be used to test the image that is likely depicted by the image.

With reference to the example of FIG. 2 at stage C, the drone 250 may determine, based on the output of the second machine learning model, that the sensor that is likely depicted by the captured image is likely associated with an "audio" test. In response to the drone 250 determining that the glass-break sensor that is likely depicted by the captured image is likely associated with an "audio" test, the drone 250 may use the sensor testing unit 250b to administer an "audio" test. The sensor testing unit 250b may administer an "audio" test by, for example, generating an audio signal (e.g., using a speaker) associated with the sound of breaking glass that is designed to make a glass-break sensor generate and broadcast sensor data indicative of a detected glass break.

The drone 250 may evaluate the response to the administered test of the glass-break sensor 220b to the "audio" test. For example, the drone 250 can determine whether the glass-break sensor 220i generated sensor data that is indicative of the presence of an audio signal that is associated with the sound of glass breaking. In response to detecting sensor data generated by the glass-break sensor 220b in response to the test, the drone 250 can evaluate whether the generated sensor data is indicative of a potential glass break. If the generated sensor data is indicative of a potential glass break, then the drone 250 can store data indicating that the glass-break sensor 220b is functioning properly. Alternatively, if the glass-break sensor 220b generates sensor data that is not indicative of a potential glass-break (e.g., noisy data, corrupt data, or the like) or the glass-break sensor 220b does not generate sensor data in response to the "audio" test, then the drone 250 can store data indicating that the glass-break sensor 220b is not functioning properly. In some implementations, the drone 250 may transmit a sensor status report to the monitoring system control unit 110, the monitoring application server 190, or a user device that provides data indicating the status of the glass-break sensor 220b alone, or in combination, with the sensor status of other sensors in the property 201. For example, the sensor status report may include data indicating the status of the smoke detector 220i and the glass-break sensor 220b.

The drone 250 may communicate with the monitoring system control unit 110, the monitoring application server 190, or both, before the administered test, during the administered test, after the administered test, or a combination thereof, to inform the monitoring system control unit 110, the monitoring application server 190, or both, that the glass-break sensor 220b is being tested as described with reference to the smoke detector 120i in FIG. 1. As a result of such communications, the monitoring system control unit 210, the monitoring application server 290, or both, may disregard (e.g., ignore) any sensor data generated by the glass-break sensor 220b as a result of the glass-break sensor test at stage C and avoid triggering a false alarm.

With respect to the aforementioned example describe drone 250 functionality at stage C, it is noted that the drone 250 need not necessarily make a determination that the sensor that is likely depicted by the captured image is a glass-break sensor 220b. Instead, the drone 250 can determine, based on respective output values provided by the first machine learning model and the second machine learning model, respectively, that a sensor likely exists within the drone's 250 "line of sight" and that the sensor is likely associated with a particular sensor test type such as an "audio" test. The drone 250 can then administer the particular "audio" test in an approximate vicinity of sensor. The drone's 250 line of sight may include a portion of the property 201 that can be captured by the drone's camera 250a.

Continuing the example of FIG. 2, the drone 250 may continue navigating along the path 205 through the property 201 using the camera 250a to scan for the surfaces of the property 201 for one or more sensors. At stage D, the drone 250 may capture an image that includes that includes a sensor such as a thermometer 220g. The drone 250 may provide the captured image of the thermometer 220g to a first machine learning model that has been trained to determine the likelihood that the captured image depicts a sensor. In this instance, the drone 250 may determine, based on the output of the first machine learning model, that the captured image of the thermometer 220g likely depicts a sensor. The drone 250 may provide the captured image to a second machine learning model. The second machine learning model is trained to predict the likelihood that the image likely depicts a sensor that is likely associated with a particular sensor test type.

With reference to the example of FIG. 2 at stage D, the drone 250 may determine, based on the output of the second machine learning model, that the sensor that is likely depicted by the captured image is likely associated with an "air temperature" test. In response to the drone 250 determining that the thermometer that is likely depicted by the captured image is likely associated with an "air temperature" test, the drone 250 may use the sensor testing unit 250b to administer an "air temperature" test. The sensor testing unit 250b may administer an "air temperature" test by, for example, generating hot air, cold air, or the like in an effort to change the temperature of the air surrounding the thermostat 220g. In some implementations, the sensor testing unit 250b may be equipped with a fan (or use its propellers) to direct the hot air or cold air towards the thermometer 220g.

The drone 250 may evaluate the response to the administered test of the thermometer 220g to the "air temperature" test. For example, the drone 250 can determine whether the thermometer 220g generated sensor data that is indicative of a potential change in temperature. The change in temperature may be an increase in temperature if the sensor testing unit 250b output hot air or a decrease in temperature if the sensor testing unit 250b output cold air. In response to detecting sensor data generated by the thermometer 220g in response to the test, the drone 250 can evaluate whether the generated sensor data is indicative of a potential change in temperature. If the generated sensor data is indicative of a potential change in temperature, then the drone 250 can store data indicating that the thermometer 220g is functioning properly. Alternatively, if the thermometer 220g generates sensor data that is not indicative of a potential change in temperature (e.g., noisy data, corrupt data, or the like) or the thermometer 220g does not generate sensor data in response to the "air temperature" test, then the drone 250 can store data indicating that the thermometer 220g is not functioning properly. In some implementations, the drone 250 may transmit a sensor status report to the monitoring system control unit 110, the monitoring application server 190, or a user device that provides data indicating the status of the thermometer 220g alone, or in combination, with the sensor status of other sensors in the property 201. For example, the sensor status report may include data indicating the status of the smoke detector 220i, the glass-break sensor 220b, and the thermometer 220g.

The drone 250 may communicate with the monitoring system control unit 110, the monitoring application server 190, or both, before the administered test, during the administered test, after the administered test, or a combination thereof, to inform the monitoring system control unit 110, the monitoring application server 190, or both, that the thermometer 220g is being tested as described with reference to the smoke detector 120i in FIG. 1. As a result of such communications, the monitoring system control unit 210, the monitoring application server 290, or both, may disregard (e.g., ignore) any sensor data generated by the thermometer 220g as a result of the thermometer test at stage D and avoid triggering a false alarm.

With respect to the aforementioned example describe drone 250 functionality at stage D, it is noted that the drone 250 need not necessarily make a determination that the sensor that is likely depicted by the captured image is a thermometer 220g. Instead, the drone 250 can determine, based on respective output values provided by the first machine learning model and the second machine learning model, respectively, that a sensor likely exists within the drone's 250 "line of sight" and that the sensor is likely associated with a particular sensor test type such as an "air temperature" test. The drone 250 can then administer the particular "air temperature" test in an approximate vicinity of sensor. The drone's 250 line of sight may include a portion of the property 201 that can be captured by the drone's camera 250a.

In this manner, the drone 250 may navigate a property 201, scan the surfaces of the property 201 to identify sensors, and administer a sensor test to one or more identified sensors. The navigation of the drone 250 along a navigation path may be based on a predetermined property 201 map such as a three-dimensional volumetric map of the property 201 that include data indicating the location of each sensor of a plurality of sensors 220a, 220b, 220c, 220d, 220e, 220f, 220g, 220h, 220i, 220j, 220k scattered through the property 201. Alternatively, the navigation of the drone 250 along a navigation path may be based on a predefined drone 250 surveillance routine. In such instances, the drone 250 may scan for sensors, and test sensors that the drone 250 identifies, in addition to the drone's 250 surveillance routine. Alternatively, the drone 250 may dynamically navigate the property using one or more drone sensors such as cameras, IR sensors, Visible Light Communication (VLC) devices, or the like to navigate through a property 201 and avoid collision with surfaces of the property 201.

Figure 3:
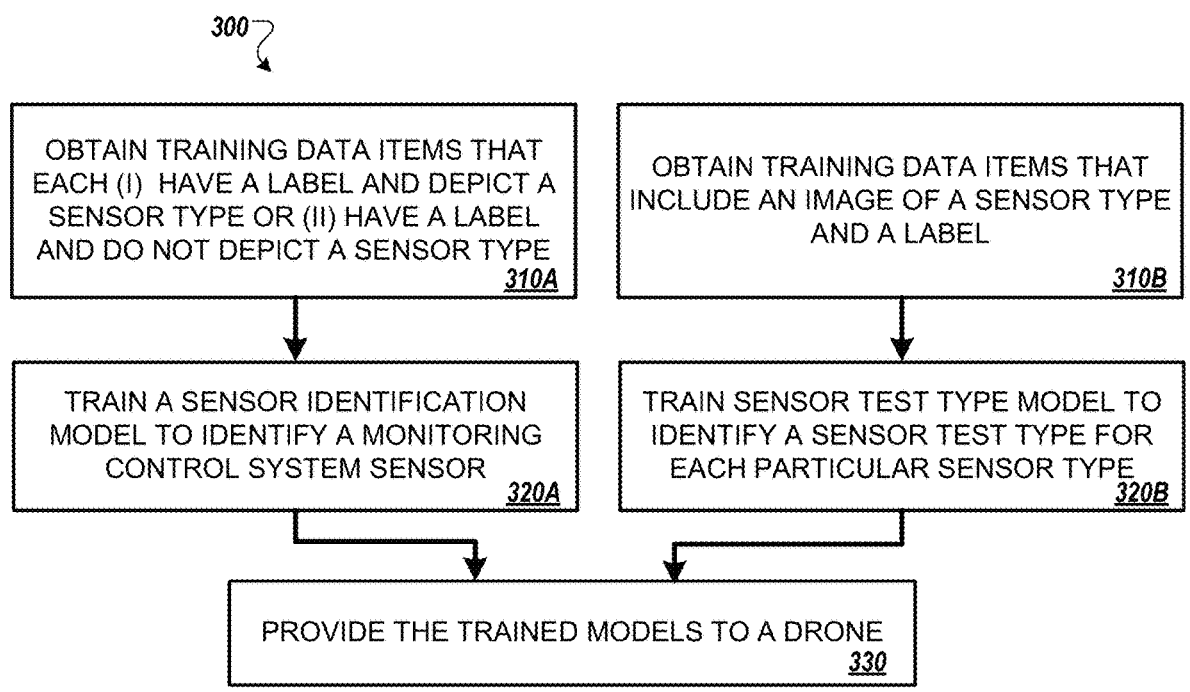
FIG. 3 is a flowchart of an example of a process for training a drone to recognize and test monitoring system sensors.

FIG. 3 is a flowchart of an example of a process 300 for training a drone to recognize and test monitoring system sensors.

Generally, the process 300 includes a first branch that obtains training data items that each (i) have a label and depict a sensor type or (ii) have a label and do not depict a sensor type (310A), and training a sensor identification model to identify monitoring control system sensors (320A). The process 300 also includes a second branch that obtains training data items that each include an image of a sensor type and a label (310B), and training a sensor test type model to identify a control manipulation type (320B). At stage 330, the trained models may be provided to a drone.

In more detail, the first branch of process 300 begins at stage 310A. At stage 310A, a monitoring application server, or other computer, may obtain a first set of training data items that each have (i) a label and an image that depicts a sensor type or (ii) a label and an image that does not depict a sensor type.

An image that depicts a sensor type may include, for example, an image of any type of sensor that can be installed in a monitoring system such as monitoring system 100 or 200. Such images may include, for example, an image of a smoke detector, an image of a glass-break sensor, an image of a thermometer, an image of a motion sensor, an image of a water sensor, or the like. The label associated with an image that depicts a sensor type may correspond to whether or not the image includes a sensor. For example, if the image depicts a smoke detector, a glass-break sensor, a thermometer, a motion sensor, a water sensor, or the like, the image will be labeled as a sensor. In practice, such a label may be represented by a value such as "1."

An image that does not depict a sensor type may include, for example, an image of any surface of a property that does not depict a sensor, an image of an object that is not as sensor, or the like. For example, an image that does not depict a sensor may include an image of a wall, ceiling, floor, kitchen counter, bar counter, or the like that does not depict a sensor. Alternatively, or in addition, an image that does not depict a sensor may include an image of an object that is not a sensor such as a picture hanging on a wall, a light switch, a window, a curtain rod, a television, or the like. The label associated with an image that does not depict a sensor may correspond to whether or not the image includes a sensor. For example, if the image does not depict a smoke detector, a glass-break sensor, a thermometer, a motion sensor, a water sensor, or the like, then the image will be labeled as not depicting a sensor. In some implementations, such a label may be represented by a value such as "0."

A monitoring application server, or other computer, may use the first set of training data items to train a sensor identification model. The sensor identification model may include a neural network, a deep neural network, or the like. Training the neural network may include, for example, generating a vector for each training data item, and using the neural network to process the training vector. In some implementations, back propagation techniques may be used to adjust weights of the neural network based on an amount of error that is determined between the output generated by the neural network in response to processing the training data item and the expected output (e.g., the training label). The neural network may be trained until the neural network begins to correctly classify a received training vector as being representative of an image that belongs into a class of images that (i) depict a sensor, or (ii) does not depict a sensor. The neural network may begin to correctly classify received images when the value output by the neural network begins to indicate that the class (e.g., includes a depicts as sensor or does not depict a sensor) predicted by the neural network for a received training vector matches the training label data associated with the training image to which the training vector corresponds.

In more detail, the second branch of process 300 begins at stage 310B. At stage 310B, a monitoring application server, or other computer, may obtain a second set of training data items that each include an image that depicts a particular sensor type and a label. In the second set of training data, the labels correspond to a particular sensor test type that is associated with the sensor depicted by the associated image. For example, if the training image in the second set of training data depicts a smoke detector, the assigned label may be a sensor test type such as "smoke test." By way of another example, if the training image from the second set of training data depicts a glass-break sensor, the assigned label may be a sensor test type such as "audio test." By way of another example, if the training image from the second set of training data depicts a thermometer (e.g., a thermostat), the label may be a sensor test type of "air temperature test." By way of another example, if the training image from the second set of training data depicts a motion sensor, the assigned label may be a sensor test type of "navigate past test." By way of yet another example, if the training image from the second set of training data depicts a water sensor, the assigned label may be a sensor test type of "moisture test." Numerous other examples fall within the scope of the present disclosure. For instance, if the training image from the second set of training data depicts a carbon monoxide detector, then the assigned label may be a sensor test type of "CO test." Though each respective sensor test type is referred to in this description with an English language name, the present disclosure need not be so limited. For example, a label corresponding to a particular sensor test type may identify the sensor test type using a number such as "0" for "smoke test," "1" for "audio test," "2" for "air temperature test," "3" for "navigate by test, "4" for a "moisture test," "5" for a "CO test," or the like. In some implementations, the values corresponding to each respective test may be a binary value.

A monitoring application server, or other computer, may use the second set of training data items to train a sensor test type model. The sensor test type model may include a neural network, a deep neural network, or the like. Training the neural network may include, for example, generating a vector for each training data item, and using the neural network to process the training vector. In some implementations, back propagation techniques may be used to adjust weights of the neural network based on an amount of error that is determined between the output generated by the neural network in response to processing the training data item and the expected output (e.g., the training label). The neural network may be iteratively trained (e.g., providing an input training data item, using the neural network to process the training data item to generate an output, determining an amount of error between the generated output and the training data label, and adjusting the weights of the neural network) until the neural network begins to correctly classify a received training vector as being representative of an image that depicts a sensor that is associated with a particular sensor test type. The neural network may begin to correctly classify received images when the value output by the neural network begins to indicate that the class (e.g., smoke test, audio test, air temperature test, navigation past test, moisture test, CO test, or the like) predicted by the neural network for a received training vector matches the training label data associated with the training image to which the training vector corresponds.

At stage 330, each of the trained models are provided to a drone. Providing the trained model to a drone at stage 330 may include, for example, transmitting the trained models to the drone via one or more networks such as a LAN, a WAN, a cellular network, the Internet, or a combination thereof. The trained models may be provided as part of a download request from a drone, a monitoring system control unit, or the like. The trained models may be provided as a new model to a drone that was not previously trained. Alternatively, or in addition, the trained models may be provided as an update to models previously provided to the drone.

Figure 4:
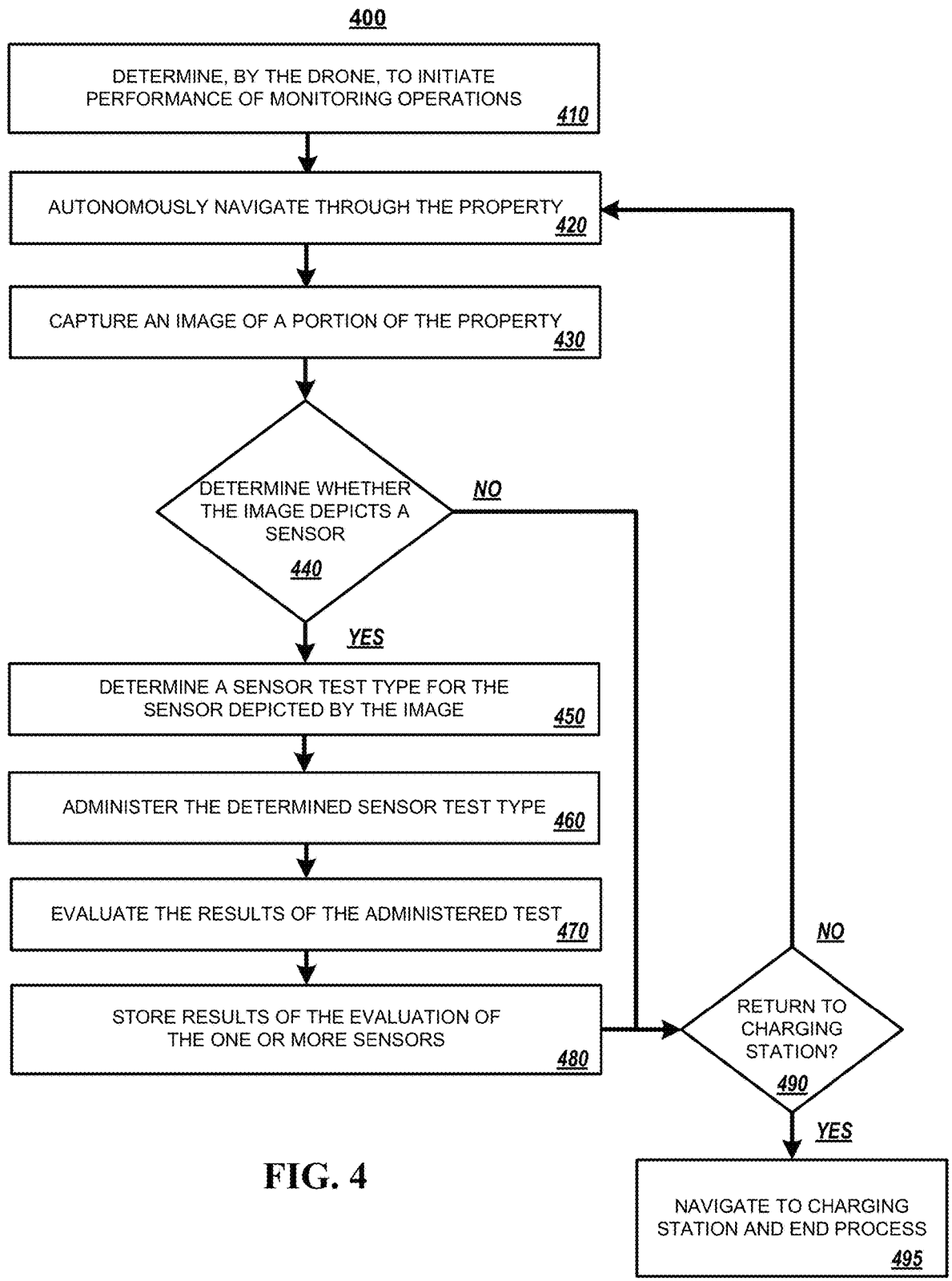
FIG. 4 is a flowchart of an example of a process for using a trained drone to test monitoring system sensors installed at a property.

FIG. 4 is a flowchart of an example of a process 400 for using a trained drone to test monitoring system sensors installed at a property. Generally, the process 400 includes determining, by the drone, to initiate performance of monitoring operations (410), autonomously navigate through the property (420), capture an image of a portion of the property (430), and determining whether the image includes a sensor (440). If it is determined that the captured image does not include a sensor, the drone may determine whether the drone should return to the charging station (490). In some implementations, the drone determines to not return to the charging station. In such instances, the drone may continue to autonomously navigate through the property 420. Alternatively, if it is determined that the image includes a sensor, the process may continue with the drone determining a sensor test type for the sensor depicted by the image (450), administering the determined sensor test type (460), evaluating the results of the administered test (470), and storing results of the evaluation of the one or more sensors (480). The process may continue with the drone determining whether to return to the charging station (490). In some implementations, the drone determines to not return to the charging station. In such instances, the drone may continue to autonomously navigate through the property 420. Alternatively, the drone may determine to return to the charging station. In such instances, the drone may navigate to the charging station, and the process 400 ends (495).

In more detail, the process 400 begins by determining 410, by the drone, to initiate monitoring operations. Initiating monitoring operations may include, for example, the drone launching from a charging station to perform surveillance operations, sensor monitoring or testing operations, or a combination thereof. The drone may determine to initiate monitoring operations in a number of different ways. For example, the drone may determine to launch in response to a determination that the drone has been idle for more than a predetermined amount of time. Alternatively, or in addition, the drone may determine to launch in response to a determination that the drone's battery is fully charged. Alternatively, or in addition, the drone may determine to launch because the drone's battery is sufficiently charged and no property occupants are presently occupying the property. Alternatively, or in addition, the drone may launch in response to an instruction to launch from a component of a monitoring system such as a monitoring system control unit, a monitoring application server, a user device, or the like.

The drone may continue performing the process 400 by autonomously navigating 420 through a property. In some implementations, the drone may autonomously navigate the property based on a predetermined navigation path. Alternatively, the drone may autonomously navigate the property using a navigation path that is dynamically determined with reference to a map such as a three-dimensional volumetric map of the property. In some implementations, navigation along a dynamically determined navigation path may include the drone using one or more drone sensors such cameras, IR sensors, VLC sensors, or the like to navigate through the property with making contact with one or more surfaces such as walls, floors, ceilings, or the like.

The drone may capture 430 on image of a portion of the property. In some implementations, the drone may capture the image during autonomous navigation of the property. For example, the drone may capture an image of a portion of the property while performing routine surveillance of the property. Alternatively, or in addition, the drone may capture an image of the property while navigating the property to perform sensor maintenance and testing.

The drone may determine 440 whether the captured image depicts a sensor. Determining whether the captured image depicts a sensor may include the drone providing the image captured at stage 430 to a first machine learning model that has been trained to classify an input image as either (i) likely depicting a sensor or (ii) not likely depicting a sensor. The first machine learning model may include a neural network that has been trained to calculate an output value indicating a likelihood that the image is associated with each respective class. The value may include a probability. In some implementations, the drone may determine, based on the output of the first machine learning model, that the image likely does not depict a sensor. In such instances, the drone does not continue to stage 450 and instead determines whether to return to the charging station 490. In some implementations, the drone may return to the charging station, and end the process at stage 495. Alternatively, the drone may determine at stage 490 to continue autonomously navigating through the property. If the drone determines 440, based on the output of the first machine learning model, that the image likely includes a sensor, then the drone may determine to continue the process 400 by proceeding to stage 450. In some implementations, the determination at stage 440 may be made by selecting the class (e.g., likely depicting a sensor or not likely depicting a sensor) that is associated with the highest output value generated by the neural network.

The drone may determine 450 a sensor test type for the sensor depicted by the image. Determining sensor test type for the sensor depicted by the image captured at stage 430 may include providing the image captured at stage 430 to a second machine learning model has been trained to determine a sensor test type. The second machine learning model may include a neural network that has been trained to classify the captured image that depicts a sensor as likely being associated with a particular test type of a plurality of sensor test types. The second machine learning model may be trained to classify the image that likely depicts a sensor into a particular class of sensor test types. For example, the second machine learning model may include a neural network that has been trained to calculate an output value indicating a likelihood that an input image that likely depicts a sensor is likely associated with each respective sensor test type of a plurality of sensor test types. The value may include a probability. The drone may select a particular sensor test type that will be used to test a sensor based on the output of the second machine learning model. In some implementations, the drone may select the sensor test type that is associated with the highest output value.

The drone may administer 460 the sensor test type that is determined at stage 450. Administering the sensor test type may include the drone using a sensor testing unit to modify (or the drone itself) to modify the environment in the vicinity of the sensor that is likely depicted by the image captured at stage 430. Modifying the environment using the sensor testing unit may include, for example, using the sensor testing unit to generate smoke that can be detected by a smoke detector, generate audio noises that can be detected by a glass-break sensor, generate changes in air temperature that can be detected by a thermometer, generating CO that can be detected by a carbon monoxide detector, or the like. In some implementations, the drone itself can be used to modify the environment in the vicinity of the sensor that is likely depicted by the image captured at stage 430. For example, a drone may be configured to navigate (e.g., fly) through a portion of a property being monitored by a motion sensor in a manner that is designed to trigger the motion sensor to detect the motion of the drone.

The drone may evaluate 470 the results of the administered test. For example, the drone can determine whether the sensor that was tested generated sensor data that indicates that the sensor is functioning properly in response to the administered test. For example, if a smoke detected was tested by the drone by using a sensor testing unit to generate smoke, the drone may determine whether the sensor generated sensor data in response to the generated smoke. If it is determined by the drone that the sensor generated in response to the administered test, the drone may further evaluate the generated sensor data. For example, using the example of a smoke detector, the drone may evaluate the detected sensor data to determine whether the sensor data is indicative of the presence of smoke. If the generated sensor data is indicative of the potential presence of smoke, then the drone can store 480 data indicating that the sensor such as a smoke detector is functioning properly.

Alternatively, continuing the above example, if the drone determines that the smoke detector generates sensor data that is not indicative of the potential presence of smoke (e.g., noisy data, corrupt data, or the like) or the smoke detector does not generate sensor data in response to the generated smoke test, then the drone can store 480 data indicating that the smoke detector is not functioning properly.

In some implementations, the drone may transmit a sensor status report to a monitoring system control unit, a monitoring application server, or a user device the provides data indicating the status of the smoke detector alone, or in combination, with the sensor status of other sensors in the property.

Once the results of the sensor test are stored, the drone may determine 490 whether the drone should return to a drone charging station. In some implementations, the drone may determine to return to a drone charging station for a number of reasons including, for example, the drone's battery has fallen below a predetermined threshold, the drone as completed the drone's surveillance monitoring, the drone has completed the drone's sensor monitoring and testing operations, in response to a user instruction to return to the charging station, in response to an instruction from the monitoring system control unit or monitoring application server, or the like. In some implementations, the drone may complete the drone's sensor monitoring and testing operations if there are not any more sensors in the property that need tested. Alternatively, or in addition, the drone may complete the drone's sensor monitoring and testing operations if the drone has scanned more than a threshold amount of the property to identify a likely sensor. However, the present disclosure need not be so limited. Instead, the drone may decide to return to a charging station for any of number different reasons.

Alternatively, in some implementations, the drone may determine not to return to the charging station. For example, the drone may determine not to return to the charging station if the drone has a batter that is sufficiently charged, the drone has additional sensors that need to be tested, the drone has not scanned more than a threshold amount of the property, or the like. Alternatively, or in addition, the drone may not determine to return to a charging station if the drone has not yet received an instruction to return to the charging station from the monitoring system control unit, the monitoring application server, or a user device. In such instances, the drone may continue to autonomously navigate through the property at stage 420.

Figure 5:
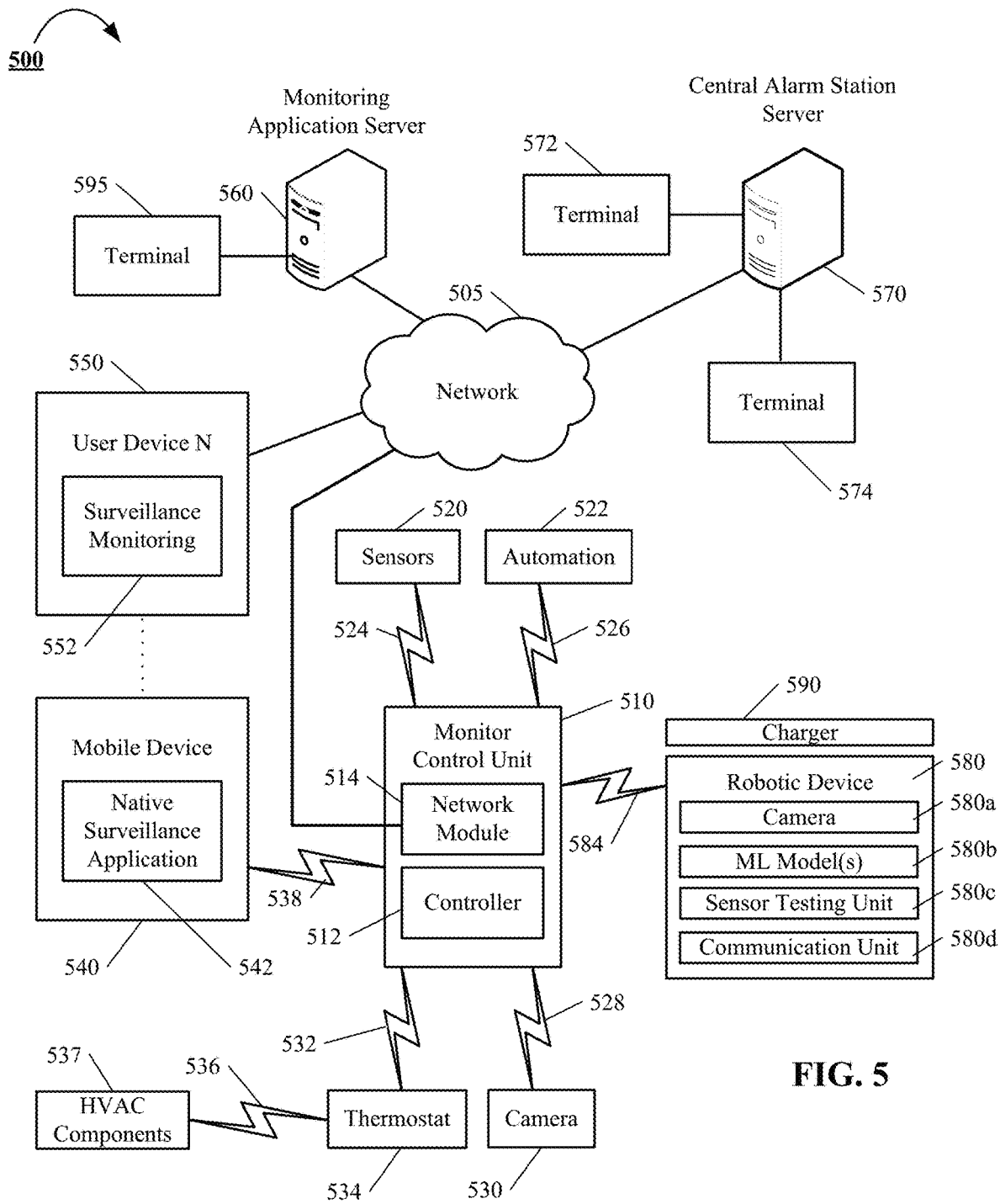
FIG. 5 is a block diagram of components that can be used to implement a system that tests monitoring system sensors using a drone that has been trained to recognize and test monitoring system sensors.

FIG. 5 is a block diagram of components that can be used to implement a system that tests monitoring system sensors using a drone that has been trained to recognize and test monitoring system sensors.

The electronic system 500 includes a network 505, a monitoring system control unit 510, one or more user devices 540, 550, a monitoring application server 560, and a central alarm station server 570. In some examples, the network 505 facilitates communications between the monitoring system control unit 510, the one or more user devices 540, 550, the monitoring application server 560, and the central alarm station server 570.

The network 505 is configured to enable exchange of electronic communications between devices connected to the network 505. For example, the network 505 may be configured to enable exchange of electronic communications between the monitoring system control unit 510, the one or more user devices 540, 550, the monitoring application server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The monitoring system control unit 510 includes a controller 512 and a network module 514. The controller 512 is configured to control a monitoring system (e.g., a home alarm or security system) that includes the monitoring system control unit 510. In some examples, the controller 512 may include a processor or other control circuitry configured to execute instructions of a program that controls operation of an alarm system. In these examples, the controller 512 may be configured to receive input from sensors, detectors, or other devices included in the alarm system and control operations of devices included in the alarm system or other household devices (e.g., a thermostat, an appliance, lights, etc.). For example, the controller 512 may be configured to control operation of the network module 514 included in the monitoring system control unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the monitoring system control unit 510 to communicate over a local area network and/or the Internet. The network module 514 also may be a voiceband modem configured to enable the alarm panel to communicate over the telephone lines of Plain Old Telephone Systems (POTS).

The monitoring system that includes the monitoring system control unit 510 includes one or more sensors or detectors. For example, the monitoring system may include multiple sensors 520. The sensors 520 may include a contact sensor, a motion sensor, a glass break sensor, or any other type of sensor included in an alarm system or security system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 520 may include a radio-frequency identification (RFID) sensor that identifies a particular article that includes a pre-assigned RFID tag.

The monitoring system control unit 510 communicates with the module 522 and the camera 530 to perform surveillance or monitoring. The module 522 is connected to one or more devices that enable home automation control. For instance, the module 522 may be connected to one or more lighting systems and may be configured to control operation of the one or more lighting systems. Also, the module 522 may be connected to one or more electronic locks at the property and may be configured to control operation of the one or more electronic locks (e.g., control Z-Wave locks using wireless communications in the Z-Wave protocol. Further, the module 522 may be connected to one or more appliances at the property and may be configured to control operation of the one or more appliances. The module 522 may include multiple modules that are each specific to the type of device being controlled in an automated manner. The module 522 may control the one or more devices based on commands received from the monitoring system control unit 210. For instance, the module 222 may cause a lighting system to illuminate an area to provide a better image of the area when captured by a camera 230.

The camera 530 may be a video/photographic camera or other type of optical sensing device configured to capture images. For instance, the camera 530 may be configured to capture images of an area within a building monitored by the monitoring system control unit 510. The camera 530 may be configured to capture single, static images of the area and also video images of the area in which multiple images of the area are captured at a relatively high frequency (e.g., thirty images per second). The camera 530 may be controlled based on commands received from the monitoring system control unit 510.

The camera 530 may be triggered by several different types of techniques. For instance, a Passive Infra Red (PIR) motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra Red, Z-wave controlled "white" lights, lights controlled by the module 522, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries if located remotely from the monitoring system control unit 510. The camera 530 may employ a small solar cell to recharge the battery when light is available. Alternatively, the camera 530 may be powered by the controller's 512 power supply if the camera 530 is co-located with the controller 512.

In some implementations, the camera 530 communicates directly with the monitoring application server 560 over the Internet. In these implementations, image data captured by the camera 530 does not pass through the monitoring system control unit 510 and the camera 530 receives commands related to operation from the monitoring application server 560.

The system 500 also includes thermostat 534 to perform dynamic environmental control at the property. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a property and/or environmental data at a property, e.g., at various locations indoors and outdoors at the property. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the monitoring system control unit 510 and can control the environmental (e.g., temperature) settings based on commands received from the monitoring system control unit 510.

In some implementations, the thermostat 534 is a dynamically programmable thermostat and can be integrated with the monitoring system control unit 510. For example, the dynamically programmable thermostat 534 can include the monitoring system control unit 510, e.g., as an internal component to the dynamically programmable thermostat 534. In addition, the monitoring system control unit 510 can be a gateway device that communicates with the dynamically programmable thermostat 534.

A module 537 is connected to one or more components of an HVAC system associated with a property, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

The system 500 further includes at least one robotic devices 580. The robotic device 580 may be any type of robot that is capable of moving and taking actions that assist in security monitoring, mapping a property, or the like. For example, the robotic devices 580 may include a drone that is capable of moving throughout a property based on automated control technology, user input control provided by a user, or a combination of both. In this example, the drone may be able to fly, roll, walk, or otherwise move about the property. The drone may include a helicopter type device (e.g., a quad copter), a rolling helicopter type device (e.g., a roller copter device that can fly and also roll along the ground, walls, or ceiling), or a land vehicle type device (e.g., an automated car that drives around a property).

The robotic device 580 may include a camera 580a. The robotic device 580 may use the camera 580a may use the camera to scan one or more surfaces of a property to detect the existence of a sensor. Scanning one or more surfaces of the property may include the drone using the camera 150a to capture still images, video images, or the like that can be further analyzed for the existence of a sensor. The captured images may be provided as an input to one or more machine learning models The robotic device 580 may store a plurality of machine learning models 580b. In some implementations, for example, the robotic device may store at least a first machine learning model and a second machine learning model. For example, the robotic device 580 may store a first machine learning model may be trained to classify an input image as either (i) likely depicting a sensor or (ii) not likely depicting a sensor. By way of another example, the robotic device 580 may store a second machine learning model that has been trained to classify the image that likely depicts a sensor into a particular class of sensor test types. The robotic device 580 may use the first machine learning model and the second machine learning model to identify sensors and determine a sensor test type for each identified sensor using the methods described herein.

The robotic device 580 may include a drone-mounted sensor testing unit 580c. The sensor testing unit 580c may include one or more testing devices that can be used to test sensor 562 associated with the property. For example, the sensor testing unit 580c may have a smoke generation unit that can be used to test a smoke detector. Alternatively, or in addition, for example, the sensor testing unit 580c may have a heat generator, an air conditioning unit, or the like that can be used to test a thermostat. Alternatively, or in addition, the sensor testing unit 580c may include a speaker that can output audio sounds to test sensors based on audio signals such as glass-break sensors, audio detection sensors for cameras, or the like. Alternatively, or in addition, the sensor testing unit 580c may include a deployable arm that can be used to open a window in an effort to test a contact sensor. Alternatively, or in addition, the sensor testing unit 580c may include a carbon monoxide gas generation unit that can be used to test carbon monoxide sensors. However, the present disclosure need not be so limited. The sensor testing unit 580a can be equipped to test any sensor that may be placed in the property and used with the monitoring system.

In some implementations, the sensor testing unit 580a may be used to deploy harmful substances such as carbon monoxide gas. However, in such instances, the sensor testing unit 580 may be configured to deploy the harmful substance in a manner that avoids any harm to occupants of the property. For example, the sensor testing unit 580 may be configured to only deploy a small amount of the substance in the vicinity of a carbon monoxide sensor to trigger without causing harm to a property occupant. In other implementations, the sensor testing unit 580a (or the robotic device 580) may be equipped with a deployable hood that can be used to cover the carbon monoxide sensor before deploying the carbon monoxide gas so that no carbon monoxide gas leaks into the property beyond the hood. In such implementations, the sensor testing unit 580a may also include a vacuum mechanism that can suck the carbon monoxide back into the sensor testing unit 580a or robotic device 580.

The robotic device 580 also may include a communication unit 580d that enables the robotic device 580 to communicate with the monitoring system control unit 510 and/or other devices. The communication unit 580d may be a wireless communication module that allows the robotic device 580 to communicate wirelessly. For instance, the communication unit 580d may be a Wi-Fi module that enables the robotic device 580 to communicate over a local wireless network at the property. The communication unit 580d further may be a 900 MHz wireless communication module that enables the robotic device 580 to communicate directly with the monitoring system control unit 510. Other types of short-range wireless communication protocols, such as Bluetooth, Bluetooth LE, Z-Wave, ZigBee, etc., may be used to allow the robotic device 580 to communicate with other devices in the property.

The robotic device 580 may use the communication unit 580d to broadcast messages regarding the robotic device's 580 test status. For example, the robotic device 580 may use the communication unit 580d to broadcast a first message with a timestamp prior to administering a test of a sensor, camera, or the like. Alternatively, or in addition, the robotic device 580 may use the communication unit 580d to broadcast a second message with a timestamp as administration of a sensor test commences, during testing of a sensor test, or the like. Alternatively, or in addition, the robotic device 580 may use the communication unit 580*d* to broadcast a third message with a timestamp after administration of the sensor test is completed. The broadcasted messages may detected by a monitoring system control unit 510, a monitoring application server 560, or the like and used to evaluate the results of each respective sensor test.

The robotic device 580 further may include processor and storage capabilities. The robotic device 580 may include any suitable processing devices that enable the robotic device 580 to operate applications and perform the actions described throughout this disclosure. In addition, the robotic device 580 may include solid state electronic storage that enables the robotic device 580 to store one or more predetermined navigation paths for the property, an initial three-dimensional volumetric map of the property, or the like.

The robotic device 580 may be associated with a charging station 590. The charging station 590 may be located at predefined home base or reference locations in the property. The robotic device 580 may be configured to navigate to the charging station 590 after completion of tasks needed to be performed for the monitoring system 500. For example, after navigating the property on a predetermined trajectory to collect data using mapping sensors 584 that can be used to generate a three-dimensional volumetric map of the property, the robotic device may be configured to automatically fly to and land on the charging station 590. In this regard, the robotic device 580 may automatically maintain a fully charged battery in a state in which the robotic devices 580 is ready for use by the monitoring system 500.

The charging station 590 may be a contact based charging station and/or a wireless charging station. For contact based charging stations, the robotic device 580 may have readily accessible points of contact that the robotic device 580 is capable of positioning and mating with a corresponding contact on the charging station. For instance, a helicopter type robotic device 580 may have an electronic contact on a portion of its landing gear that rests on and mates with an electronic pad of a charging station when the helicopter type robotic device 580 lands on the charging station. The electronic contact on the robotic device 580 may include a cover that opens to expose the electronic contact when the robotic device 580 is charging and closes to cover and insulate the electronic contact when the robotic device 580 is in operation.

For wireless charging stations, the robotic device 580 may charge through a wireless exchange of power. In these cases, the robotic device 580 need only locate themselves closely enough to the wireless charging station for the wireless exchange of power to occur. In this regard, the positioning needed to land at a predefined home base or reference location in the property may be less precise than with a contact based charging station. Based on the robotic device 580 landing at a wireless charging station, the wireless charging station outputs a wireless signal that the robotic device 580 receives and converts to a power signal that charges a battery maintained on the robotic device 580.

The sensors 520, the module 522, the camera 530, the thermostat 534, and the robotic devices 580 and 582 communicate with the controller 512 over communication links 524, 526, 528, 532, and 584. The communication links 524, 526, 528, 532, and 584 may be a wired or wireless data pathway configured to transmit signals from the sensors 520, the module 522, the camera 530, the thermostat 534, and the robotic device 580 to the controller 512. The sensors 520, the module 522, the camera 530, the thermostat 534, and the robotic device 580 may continuously transmit sensed values to the controller 512, periodically transmit sensed values to the controller 512, or transmit sensed values to the controller 512 in response to a change in a sensed value.

The communication links 524, 526, 528, 532, and 584 may include a local network. The sensors 520, the module 522, the camera 530, the thermostat 534, and the robotic device 580 and the controller 512 may exchange data and commands over the local network. The local network may include 802.11 "Wi-Fi" wireless Ethernet (e.g., using low-power Wi-Fi chipsets), Z-Wave, Zigbee, Bluetooth, "Home-plug" or other "Powerline" networks that operate over AC wiring, and a Category 5 (CAT5) or Category 6 (CAT6) wired Ethernet network. The local network may be a mesh network constructed based on the devices connected to the mesh network.

The monitoring application server 560 is an electronic device configured to provide monitoring services by exchanging electronic communications with the monitoring system control unit 510, the one or more user devices 540, 550, and the central alarm station server 570 over the network 505. For example, the monitoring application server 560 may be configured to monitor events (e.g., alarm events) generated by the monitoring system control unit 510. In this example, the monitoring application server 560 may exchange electronic communications with the network module 514 included in the monitoring system control unit 510 to receive information regarding events (e.g., alarm events) detected by the monitoring system control unit 510. The monitoring application server 560 also may receive information regarding events (e.g., alarm events) from the one or more user devices 540, 550.

In some examples, the monitoring application server 560 may route alarm data received from the network module 514 or the one or more user devices 540, 550 to the central alarm station server 570. For example, the monitoring application server 560 may transmit the alarm data to the central alarm station server 570 over the network 505.

The monitoring application server 560 may store sensor and image data received from the monitoring system and perform analysis of sensor and image data received from the monitoring system. Based on the analysis, the monitoring application server 560 may communicate with and control aspects of the monitoring system control unit 510, one or more robotic device 580 the one or more user devices 540, 550, or a combination thereof.

The monitoring system control unit 510, the monitoring application server 560, or both may be used to evaluate the results of a sensor test. For example, the monitoring system control unit 510, the monitoring application server 560, or both can be used to detect sensor data, or lack thereof, generated during a period of time associated with the sensor test, and determine whether the sensor is functioning properly. The period of time associated with the sensor test may be based on, for example, time stamps associated with one or more messages broadcast by the drone prior to administration of a sensor test, during administration of the sensor test, and after administration of the of sensor test.

The central alarm station server 570 is an electronic device configured to provide alarm monitoring service by exchanging communications with the monitoring system control unit 510, the robotic device 580, the one or more mobile devices 540, 550, and the monitoring application server 560 over the network 505. For example, the central alarm station server 570 may be configured to monitor alarm events generated by the monitoring system control unit 510. In this example, the central alarm station server 570 may exchange communications with the network module 514 included in the monitoring system control unit 510 to receive information regarding alarm events detected by the monitoring system control unit 510. The central alarm station server 570 also may receive information regarding alarm events from the one or more mobile devices 540, 550, the robotic device 580, and/or the monitoring application server 560.

The central alarm station server 570 is connected to multiple terminals 572 and 574. The terminals 572 and 574 may be used by operators to process alarm events. For example, the central alarm station server 570 may route alarm data to the terminals 572 and 574 to enable an operator to process the alarm data. The terminals 572 and 574 may include general-purpose computers (e.g., desktop personal computers, workstations, or laptop computers) that are configured to receive alarm data from a server in the central alarm station server 570 and render a display of information based on the alarm data. For instance, the controller 512 may control the network module 514 to transmit, to the central alarm station server 570, alarm data indicating that a sensor 520 detected a door opening when the monitoring system was armed. The central alarm station server 570 may receive the alarm data and route the alarm data to the terminal 572 for processing by an operator associated with the terminal 572. The terminal 572 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 572 and 574 may be mobile devices or devices designed for a specific function. Although FIG. 5 illustrates two terminals for brevity, actual implementations may include more (and, perhaps, many more) terminals.

The one or more user devices 540, 550 are devices that host and display user interfaces. For instance, the user device 540 is a mobile device that hosts one or more native applications (e.g., the native surveillance application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a native surveillance application 542. The native surveillance application 542 refers to a software/firmware program running on the corresponding mobile device that enables the user interface and features described throughout. The user device 540 may load or install the native surveillance application 542 based on data received over a network or data received from local media. The native surveillance application 542 runs on mobile devices platforms, such as iPhone, iPod touch, Blackberry, Google Android, Windows Mobile, etc. The native surveillance application 542 enables the user device 540 to receive and process image and sensor data from the monitoring system.

The user device 550 may be a general-purpose computer (e.g., a desktop personal computer, a workstation, or a laptop computer) that is configured to communicate with the monitoring application server 560 and/or the monitoring system control unit 510 over the network 505. The user device 550 may be configured to display a surveillance monitoring user interface 552 that is generated by the user device 550 or generated by the monitoring application server 560. For example, the user device 550 may be configured to display a user interface (e.g., a web page) provided by the monitoring application server 560 that enables a user to perceive images captured by the camera 530 and/or reports related to the monitoring system. Although FIG. 5 illustrates two user devices for brevity, actual implementations may include more (and, perhaps, many more) or fewer user devices.

In some implementations, the one or more user devices 540, 550 communicate with and receive monitoring system data from the monitoring system control unit 510 using the communication link 538. For instance, the one or more user devices 540, 550 may communicate with the monitoring system control unit 510 using various local wireless protocols such as Wi-Fi, Bluetooth, Z-Wave, ZigBee, HomePlug (Ethernet over powerline), or wired protocols such as Ethernet and USB, to connect the one or more user devices 540, 550 to local security and automation equipment. The one or more user devices 540, 550 may connect locally to the monitoring system and its sensors and other devices. The local connection may improve the speed of status and control communications because communicating through the network 505 with a remote server (e.g., the monitoring application server 560) may be significantly slower.

Although the one or more user devices 540, 550 are shown as communicating with the monitoring system control unit 510, the one or more user devices 540, 550 may communicate directly with the sensors and other devices controlled by the monitoring system control unit 510. In some implementations, the one or more user devices 540, 550 replace the monitoring system control unit 510 and perform the functions of the monitoring system control unit 510 for local monitoring and long range/offsite communication.

In other implementations, the one or more user devices 540, 550 receive monitoring system data captured by the monitoring system control unit 510 through the network 505. The one or more user devices 540, 550 may receive the data from the monitoring system control unit 510 through the network 505 or the monitoring application server 560 may relay data received from the monitoring system control unit 510 to the one or more user devices 540, 550 through the network 505. In this regard, the monitoring application server 560 may facilitate communication between the one or more user devices 540, 550 and the monitoring system.

In some implementations, the one or more user devices 540, 550 may be configured to switch whether the one or more user devices 540, 550 communicate with the monitoring system control unit 510 directly (e.g., through link 538) or through the monitoring application server 560 (e.g., through network 505) based on a location of the one or more user devices 540, 550. For instance, when the one or more user devices 540, 550 are located close to the monitoring system control unit 510 and in range to communicate directly with the monitoring system control unit 510, the one or more user devices 540, 550 use direct communication. When the one or more user devices 540, 550 are located far from the monitoring system control unit 510 and not in range to communicate directly with the monitoring system control unit 210, the one or more user devices 540, 550 use communication through the monitoring application server 560.

Although the one or more user devices 540, 550 are shown as being connected to the network 505, in some implementations, the one or more user devices 540, 550 are not connected to the network 505. In these implementations, the one or more user devices 540, 550 communicate directly with one or more of the monitoring system components and no network (e.g., Internet) connection or reliance on remote servers is needed.

In other implementations, the system 500 further includes network 505 and the sensors 520, the module 522, the camera 530, the thermostat 534, and the robotic device 580 is configured to communicate sensor and image data to the one or more user devices 540, 550 over network 505 (e.g., the Internet, cellular network, etc.). In yet another implementation, the sensors 520, the module 522, the camera 530, the thermostat 534, and the robotic device 580 (or a component, such as a bridge/router) are intelligent enough to change the communication pathway from a direct local pathway when the one or more user devices 540, 550 are in close physical proximity to the sensors 520, the module 522, the camera 530, the thermostat 534, and the robotic device 580 to a pathway over network 505 when the one or more user devices 540, 550 are farther from the sensors 520, the module 522, the camera 530, the thermostat 534, and the robotic device 580. In some examples, the system leverages GPS information from the one or more user devices 540, 550 to determine whether the one or more user devices 540, 550 are close enough to the sensors 520, the module 522, the camera 530, the thermostat 534, and the robotic device 580 to use the direct local pathway or whether the one or more user devices 540, 550 are far enough from the sensors 520, the module 522, the camera 530, the thermostat 534, and the robotic device 580 that the pathway over network 505 is required. In other examples, the system leverages status communications (e.g., pinging) between the one or more user devices 540, 550 and the sensors 520, the module 522, the camera 530, the thermostat 534, and the robotic device 580 to determine whether communication using the direct local pathway is possible. If communication using the direct local pathway is possible, the one or more user devices 540, 550 communicate with the sensors 520, the module 522, the camera 530, the thermostat 534, and the robotic device 580 using the direct local pathway. If communication using the direct local pathway is not possible, the one or more user devices 540, 550 communicate with the sensors 520, the module 522, the camera 530, the thermostat 534, and the robotic device 580 using the pathway over network 505.

The invention claimed is:

1. A drone comprising:
one or more processors; and
one or more storage devices, wherein the storage devices include a plurality of instructions that, when executed by the one or more processors, cause the drone to perform operations, the operations comprising:
capturing, by the drone, an image while navigating along a path towards a location of a property;
providing, by the drone, the image as input to a machine learning model trained to identify a likelihood that a given image includes one or more sensors associated with a monitoring system of the property;
obtaining, by the drone and from the machine learning model, data indicating that the image likely includes a particular sensor;
based on obtaining the data indicating that the image likely includes a particular sensor:
interrupting, by the drone, navigation through the property along the path, and
performing, by the drone, a test on the particular sensor;
determining, by the drone, whether the particular sensor is properly functioning based on results of the test that was performed on the particular sensor;
providing, by the drone and for output, data indicating whether the particular sensor is properly functioning; and
after providing the data indicating whether the particular sensor is properly functioning for output, continuing, by the drone, navigation through the property along the path.

2. The drone of claim 1, wherein:
the drone comprises a camera; and
the image captured while navigating along the path is captured by the camera.

3. The drone of claim 1, wherein the operations further comprise:
providing, by the drone, the image as input to a second machine learning model trained to predict a sensor test type for one or more sensors determined to be included in a given image;
obtaining, by the drone and from the second machine learning model, data indicating a predicted sensor test type for the image; and
performing the test on the particular sensor by performing a test of the predicted sensor test type on the particular sensor.

4. The drone of claim 2, wherein the operations further comprise:
using, by the drone, the camera to capture a second image while the drone is navigating along the path;
determining, by the drone, that the second image does not include a sensor; and
based on determining that the second image does not include a sensor, continuing navigation along the path without providing the second image to a second machine learning model trained to predict a sensor test type for one or more sensors determined to be included in a given image.

5. The drone of claim 3, wherein the operations further comprise:
capturing, by the drone, a second image while navigating along the path;
providing, by the drone, the second image as an input to the machine learning model; and
obtaining, by the drone and from the first machine learning model, data indicating that the the second image does not include a sensor.

6. The drone of claim 1, wherein the operations further comprise:
transmitting, by the drone and prior to performing the test, a message to a monitoring system that instructs the monitoring system to disregard sensor data generated by the sensor for a predetermined amount of time.

7. The drone of claim 1, wherein:
the drone comprises a sensor testing unit;
the particular sensor is a smoke detector; and
performing the test on the particular sensor comprises:

using, by the drone, the sensor testing unit to emit an airborne material that is configured to trigger the smoke detector to generate sensor data that is indicative of the presence of smoke.

8. The drone of claim 7, wherein:
the drone comprises a communication unit;
determining whether the particular sensor is properly functioning comprises:
    using, by the drone, the communication unit to detect that the smoke detector did not generate sensor data that is indicative of the presence of smoke within a predetermined amount of time of performing the test on the smoke detector, and
based on determining that the smoke detector did not generate sensor data that is indicative of the presence of smoke within the predetermined amount of time of performing the test on the smoke detector, determining, by the drone, that the smoke detector is not functioning properly.

9. The drone of claim 1, wherein:
the drone comprises a sensor testing unit;
the particular sensor is a carbon monoxide detector;
performing the test to the particular sensor comprises:
    using, by the drone, the sensor testing unit to emit carbon monoxide gas that is configured to trigger the carbon monoxide sensor to generate sensor data that is indicative of the presence of carbon monoxide.

10. The drone of claim 9, wherein:
the drone comprises a communication unit; and
determining whether the particular sensor is properly functioning comprises:
    using, by the drone, the communication unit to detect that the carbon monoxide sensor did not generate sensor data that is indicative of the presence of carbon monoxide within a predetermined amount of time of performing the test on the carbon monoxide sensor, and
    based on determining that the carbon monoxide detector did not generate sensor data that is indicative of the presence of carbon monoxide within the predetermined amount of time of performing the test on the carbon monoxide sensor, determining, by the drone, that the carbon monoxide detector is not functioning properly.

11. The drone of claim 1, wherein:
the drone comprises a sensor testing unit;
the particular sensor is a glass break sensor; and
performing, the test to the particular sensor comprises:
    using, by the drone, a sensor testing unit to output an audio signal configured to trigger the glass break sensor to generate sensor data that is indicative of an occurrence of breaking glass.

12. The drone of claim 11, wherein:
the drone comprises a communication unit;
determining whether the particular sensor is properly functioning comprises:
    using, by the drone, the communication unit to detect that the glass break sensor did not generate sensor data that is indicative of an occurrence of breaking glass within a predetermined amount of time of performing the test on the glass break sensor, and
    based on determining that the glass break sensor did not generate sensor data that is indicative of an occurrence of breaking glass within the predetermined amount of time of performing the test on the glass break sensor, determining, by the drone, that the glass break sensor is not functioning properly.

13. The drone of claim 1, wherein:
the drone comprises a sensor testing unit;
the particular sensor is a thermometer; and
performing the test to the particular sensor comprises:
    using, by the drone, the sensor testing unit to generate air flow towards the thermometer to trigger the thermometer to generate sensor data that is indicative of a change in temperature from a point in time prior to the generation of the air flow by the sensor testing unit, wherein the temperature of the air flow is different than the temperature of the room where the drone and thermometer are located.

14. The drone of claim 13, wherein:
the drone comprises a communication unit; and
determining whether the particular sensor is properly functioning comprises:
    using, by the drone, the communication unit to detect that the thermometer did not generate sensor data that is indicative of a change in temperature responsive to the generated air flow within a predetermined amount of time of performing the test on the thermometer, and
    based on determining that the thermometer did not generate sensor data that is indicative of a change in temperature responsive to the generated air flow within the predetermined amount of time of performing the test on the thermometer, determining, by the drone, that the thermometer is not functioning properly.

15. The drone of claim 1, wherein:
the drone comprises a sensor test unit;
the particular sensor is a motion sensor; and
performing the test to the particular sensor comprises:
    navigating, by the drone, through a portion of a property being monitored by the motion sensor to trigger the motion sensor to generate sensor data that is indicative of the presence of a moving object.

16. The drone of claim 15, wherein:
the drone comprises a communication unit,
determining whether the particular sensor is properly functioning comprises:
    using, by the drone, the communication unit to detect that the motion sensor did not generate sensor data that is indicative of the presence of a moving object within a predetermined amount of time of performing the test on the thermometer, and
    based on determining that the motion sensor did not generate sensor data that is indicative of the presence of a moving object within the predetermined time of performing the test on the motion sensor, determining, by the drone, that the motion sensor is not functioning properly.

17. A method comprising:
capturing, by the drone, an image while navigating along a path towards a location of a property;
providing, by the drone, the image as input to a machine learning model trained to identify a likelihood that a given image includes one or more sensors associated with a monitoring system of the property;
obtaining, by the drone and from the machine learning model, data indicating that the image likely includes a particular sensor;
based on obtaining the data indicating that the image likely includes a particular sensor;
    interrupting, by the drone, navigation through the property along the path, and performing, by the drone, a test on the particular sensor;

determining, by the drone, whether the particular sensor is properly functioning based on results of the test that was performed on the particular sensor;

providing, by the drone and for output, data indicating whether the particular sensor is properly functioning; and after providing the data indicating whether the particular sensor is properly functioning for output, continuing, by the drone, navigation through the property along the path.

18. The method of claim 17, wherein:

the drone comprises a camera; and the image captured while navigating along the path is captured by the camera.

19. The method of claim 17, further comprising:

providing, by the drone, the image as input to a second machine learning model trained to predict a sensor test type for one or more sensors determined to be included in a given image;

obtaining, by the drone and from the second machine learning model, data indicating a predicted sensor test type for the image; and performing the test on the particular sensor by performing a test of the predicted sensor test type on the particular sensor.

20. The method of claim 18, further comprising:

using, by the drone, the camera to capture a second image while the drone is navigating along the path;

determining, by the drone, that the second image does not include a sensor; and based on determining that the second image does not include a sensor, continuing navigation along the path without providing the second image to a second machine learning model trained to predict a sensor test type for one or more sensors determined to be included in a given image.

\* \* \* \* \*